United States Patent
Rader et al.

(10) Patent No.: US 7,281,066 B2
(45) Date of Patent: Oct. 9, 2007

(54) MEMORY ACCESS SYSTEM INCLUDING SUPPORT FOR MULTIPLE BUS WIDTHS

(75) Inventors: Sheila M. Rader, Wildwood, IL (US); Pradeep Garani, Toulouse (FR); Franz Steininger, Gilbert, AZ (US); Brian G. Lucas, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/221,265

(22) Filed: Sep. 7, 2005

(65) Prior Publication Data
US 2006/0010264 A1    Jan. 12, 2006

Related U.S. Application Data

(62) Division of application No. 09/591,682, filed on Jun. 9, 2000, now Pat. No. 7,089,344.

(51) Int. Cl.
*G06F 3/00* (2006.01)
(52) U.S. Cl. ............................ 710/51; 710/22; 710/58; 710/60; 710/66
(58) Field of Classification Search ............ 710/22, 710/51
See application file for complete search history.

(56) References Cited

U.S. PATENT DOCUMENTS

| | | | | |
|---|---|---|---|---|
| 5,937,174 | A * | 8/1999 | Weber | 710/312 |
| 6,145,024 | A * | 11/2000 | Maezawa et al. | 710/14 |
| 6,163,828 | A * | 12/2000 | Landi et al. | 710/240 |
| 6,209,118 | B1 * | 3/2001 | LaBerge | 716/1 |
| 6,526,462 | B1 * | 2/2003 | Elabd | 710/242 |
| 6,567,908 | B1 * | 5/2003 | Furuhashi | 711/211 |
| 2001/0021998 | A1 * | 9/2001 | Margulis | 725/81 |

* cited by examiner

*Primary Examiner*—Donald Sparks
*Assistant Examiner*—Niketa I. Patel
(74) *Attorney, Agent, or Firm*—Lawrence J. Chapa

(57) ABSTRACT

A direct memory access system consists of a direct memory access controller establishing a direct memory access data channel and including a first interface for coupling to a memory. A second interface is for coupling to a plurality of nodes. And a processor is coupled to the direct memory access controller and coupled to the second interface, wherein the processor configures the direct memory access data channel to transfer data between a programmably selectable respective one or more of the plurality of nodes and the memory. In some embodiments, the plurality of nodes are a digital signal processor memory and a host processor memory of a multi-media processor platform to be implemented in a wireless multi-media handheld telephone.

6 Claims, 7 Drawing Sheets

MEMORY ACCESS SYSTEM INCLUDING SUPPORT FOR MULTIPLE BUS WIDTHS

CROSS REFERENCE TO RELATED APPLICATIONS

This application is a division of U.S. patent application Ser. No. 09/591,682, filed Jun. 9, 2000, which is now U.S. Pat. No. 7,089,344.

BACKGROUND OF THE INVENTION

The present invention relates to wireless handheld multi-media devices, such as digital telephones, and more specifically to processor platforms in wireless handheld multi-media devices. Even more specifically, the present invention relates to such processor platforms having minimal size and power consumption and that enable efficient data transfers between multiple processors of the processor platform and multiple peripherals.

New standards for digital cellular systems incorporate high speed packet data network capability in addition to traditional circuit switched voice and data channels. At the same time, among the general public, there is wide spread use of the Internet which offers a host of personal communication, information, electronic commerce and entertainment services. The next generation cellular systems offers the opportunity to market wireless products which have voice, data, and personal information management capabilities, i.e. multi-media devices. These products are destined to become portable information appliances with the potential for significant market share.

In such multi-media devices, in particular digital cellular telephones, processor platforms include two main processor cores: a digital signal processor (DSP) core coupled to the radio interface and a host processor core for running the device and coordinating data movements from several peripherals. Such a device may include as peripherals, a Universal Serial Bus (USB), a Universal Asynchronous Receiver/Transmitter (UART) with an optional mode to support the IrDA standard, a Synchronous Serial Interface (SSI), a Multi-Media Card (MMC), and a BLUETOOTH wireless communication protocol compliant interface supporting the BLUETOOTH wireless communication protocol standard.

It is desirable to be able to move data to and from the various peripherals and the memory of the host processor, and also to and from the various peripherals and the memory of the DSP, and furthermore, to and from the memory of the DSP and the memory of the host processor. Using a technique known in the art as Direct Memory Access (DMA), such transfers advantageously take place without involving either the host processor or the DSP. Thus, for example, instead of the host processor initiating a data transfer from a particular peripheral to the host processor memory, a DMA controller performs the data transfer, allowing the host processor to focus on more important functions. Advantageously, the DMA technique relieves the host processor and the DSP from the cumbersome tasks of simple data transfers, enabling faster and more efficient use of the processors within the device.

However, a DMA controller forms a hardwired unidirectional data channel between two nodes. The DMA controller is coupled between a particular peripheral and the system bus which accesses both the processor to be relieved of the task of performing the data transfer and it's memory. The DMA controller provides the hardware to implement the direct memory access. Because each data channel is unidirectional, two separate DMA data channels are required for bidirectional data transfers between the two nodes. Furthermore, since each data channel is implemented in hardware, once established, the data channel may not be reconfigured to allow a data transfer to and from different nodes or in a different direction.

Thus, separate unidirectional data channels must be hardwired to allow direct memory access for multiple processors and multiple peripherals. Disadvantageously, in handheld multi-media devices, there may be a large number of peripherals; thus, requiring many DMA controllers to hardwire all of the possible DMA connections. For example, to adequately relieve the host processor and the DSP from having to perform data transfers between the peripherals and the respective memories, DMA controllers must be implemented in hardware between each peripheral and the host processor memory and the DSP memory, such that each DMA controller establishes the desired unidirectional data channels.

Disadvantageously, in small handheld applications, implementing a large number of DMA controllers expends valuable real estate on the processor platform. In other words, the more hardware DMA controllers needed, the more transistors are required on the processor platform and the more space is consumed on the platform by the DMA hardware. What is needed is a processor platform that implements DMA functionality to allow efficient operation of multiple processors without using traditional DMA hardware for all of the various data transfer paths.

Another concern in processor platforms for small handheld multi-media processors is minimizing power consumption. Employing a processor platform without concern for saving power unnecessarily reduces the battery life, which is important in handheld applications because this decreases the time in between battery charges that are required. Furthermore, in multi-media applications which require a large random access memory (RAM), it is desirable to employ dynamic RAM (DRAM) as opposed to static RAM (SRAM), since DRAM is much less costly than SRAM in terms of die size versus array density.

Additionally, embedded DRAM (eDRAM), which is DRAM embedded on the processor platform, may be used to reduce the overall space required by the processor platform. However, in comparison to SRAM, both DRAM and eDRAM must be periodically refreshed in order to ensure that the data contained therein is saved. The refreshing process, typically performed by a refresh controller, consumes valuable power to make sure that data remains stored. What is needed is a method to refresh the DRAM in such a way as to conserve as much power as possible.

Furthermore, in such handheld multi-media devices, such as telephones, liquid crystal displays (LCDs), such as those found in personal digital assistants (PDAs), are implemented to allow the user to readily view web pages, for example. A typical LCD requires data to be moved from the video buffer to the display driver circuit. This presents problems in that the large LCD bus must transmit and receive data from 8, 16, or 32 bit busses from a memory (e.g. eDRAM) that is only 8, 16 or 32 bits wide. Disadvantageously, the LCD controller and image processor of the LCD spend much time using the system memory, as a video buffer, relative to other peripherals and devices that are required to access the system memory for DMA techniques, which makes the system memory less accessible to these other peripherals and devices. Thus, when video images are displayed on the LCD, the system memory (e.g. eDRAM) acts primarily as the video buffer and also as the system RAM. A separate RAM (e.g. another eDRAM) may be implemented to act as the video buffer; however, such additional memory disadvantageously adds to the transistor count and thus size of the processor platform. What is needed is an efficient memory that can adequately support an LCD controller and at the same time be used as a system RAM and for DMA data transfers.

The present invention advantageously addresses the above and other needs.

BRIEF DESCRIPTION OF THE DRAWINGS

The above and other aspects, features and advantages of the present invention will be more apparent from the following more particular description thereof, presented in conjunction with the following drawings and Appendices A and B wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

The present invention advantageously addresses the needs above as well as other needs by providing a wireless multimedia processor platform including multiple processor cores, multiple peripherals, and an interprocessor communication module that performs programmable direct memory access functionality for programmably selectable data transfers between the memories of the multiple processor cores and the various peripherals attached thereto. Furthermore, the processor platform includes features that minimize the size and power consumption of the processor platform as well as allow video buffering from the host processor memory to support an LCD display without limiting the ability of other devices to access the host processor memory.

Multi-Media Processor Platform Overview

Figure 1:
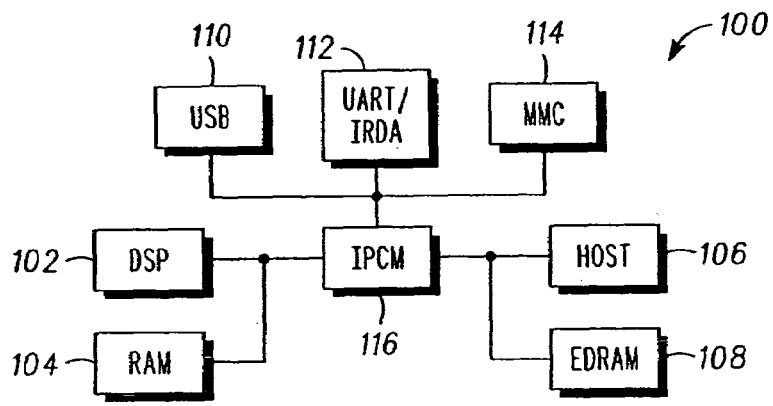
FIG. 1 is a high level block diagram of a wireless multimedia processor platform having three processor cores: a digital signal processor (DSP), a host processor, and a RISC processor core within an interprocessor communication module (IPCM), wherein the interprocessor communication module performs programmable direct memory access functionality.

Referring first to FIG. 1, a high level block diagram is shown of a wireless multimedia processor platform having three processor cores: a digital signal processor (DSP), a host processor, and a RISC processor core within an interprocessor communication module (IPCM), wherein the interprocessor communication module performs programmable direct memory access data transfers. Shown is a multimedia processor platform 100 including a digital signal processor 102 (also referred to as DSP 102), a random access memory 104 (also referred to as RAM, DSP memory or DSP RAM), a host processor 106 (also referred to as host 106 or MCore), an embedded dynamic random access memory 108 (also referred to as eDRAM 108 or host processor memory), a Universal Serial Bus 110 (also referred to as USB 110), a Universal Asynchronous Receiver/Transmitter 112 with an optional mode to support the IrDA standard (also referred to as UART/IrDA 112), a Multi-Media Card 114 (also referred to as MMC 114), and an interprocessor communication module 116 (also referred to as IPCM 116).

The multimedia processor platform 100, which may also be referred to as a processor platform 100 or simply processor 100, is in the form of a single integrated circuit or chip having three processor cores: the DSP 102, the host processor 106, and a RISC processor core within the IPCM 116. The processor 100 represents a "system on a chip" design (also referred to as "SOC"). In the application of a wireless handheld multimedia devices, it is advantageous that the components of the processor 100 all appear on a single chip. This is because of the size constraints in the handheld applications and also due to the fact that separate processors on separate chips must be hardwired together which may result in losses from wiring chip to chip. However, it is important to note that the present invention is not limited to a system on a chip design, and thus, the three processor cores, i.e. the DSP 102, the host processor 106, and RISC processor core of the IPCM 116, may be implemented on separate chips if so desired in another application.

In operation, the IPCM 116 couples all three of the DSP portion (i.e the DSP 102 and RAM 104), the host portion (i.e. the host processor 106 and the eDRAM 108) and the peripherals (i.e. the USB 110, the UART/IrDA 112, and the MMC 114) together. Advantageously, the IPCM 116 provides programmable direct memory access (DMA) data channels to allow direct memory access data transfers (1) from a particular peripheral to either the DSP RAM 104 or the eDRAM 108, (2) from the DSP RAM 104 or the eDRAM 108 to a particular peripheral, and (3) between the DSP RAM 104 and the eDRAM 108. These DMA data transfers may be time coordinated (occurring at predetermined times) or event coordinated (occurring upon request or instruction). The IPCM 116 has a reduced instruction set computer (RISC) processor core that enables direct memory access (DMA) data transfers over programmably selectable DMA data channels. For example, the IPCM 116 replaces a large number of hardware DMA controllers to create, for example, 32 programmable data channels, wherein each data channel may be programmed to transfer data in any one of the three directions above. An equivalent hardware DMA implementation generally would require 2*n*(c+1) individual DMA data hardware controllers, where the number 2 represents data channels in two directions, n represents the number of data channels and c represents the number of processors capable of using the IPCM 116, such that c+1 is the number of data paths. In the embodiment shown, n=32, c=2 (i.e. the DSP 102 and the host processor 106) such that c+1=3 (i.e. the number of data paths, e.g. peripheral to memory, memory to peripheral and memory to memory), which results in the IPCM 116 replacing of 192 individual hardware DMA controllers. Disadvantageously, this large number of DMA controllers would not be cost effective and would dominate the available space of the processor. Thus, the IPCM 116 provides a number of DMA data channels or data paths that are each configurable or programmable to connect different nodes together. As such, a node is typically the RAM 104, eDRAM 108, or one of the peripherals. Thus, a single DMA data channel may be programmed to provide a direct memory access data transfer from the USB 110 to the eDRAM 108, and then the same data channel may be reprogrammed or reconfigured at a later time to provide a direct memory access data transfer to from the DSP RAM 104 to the MMC 114.

This is a departure from hardware DMA controllers which provide a non-programmable, unidirectional wired data channel from one node to another node, which may not be later reconfigured as between two different nodes. Advantageously, in a wireless multi-media application, where the physical size of the chip or processor 100 is important and there are a large number of peripheral devices requiring many DMA controllers for direct memory access, the IPCM 116 provides a programmable DMA functionality in which a data channel is formed that may be altered as needed. Thus, many DMA controllers are not needed and the overall size of the processor 100 may be made smaller than if many hardware DMA controllers were implemented.

The function of the IPCM 116 advantageously relieves both the host processor 106 and the DSP 104 from having to stop performing tasks in order to perform data transfers. The IPCM 116 performs these transfers in order to provide the most efficient operation of both the DSP 102 and the host processor 106. In other words, the DSP 102 and the host processor 106 are allowed to operate at their optimal speeds and perform the critical tasks that they were designed for without slowing down to perform simple data transfers.

Figure 2:
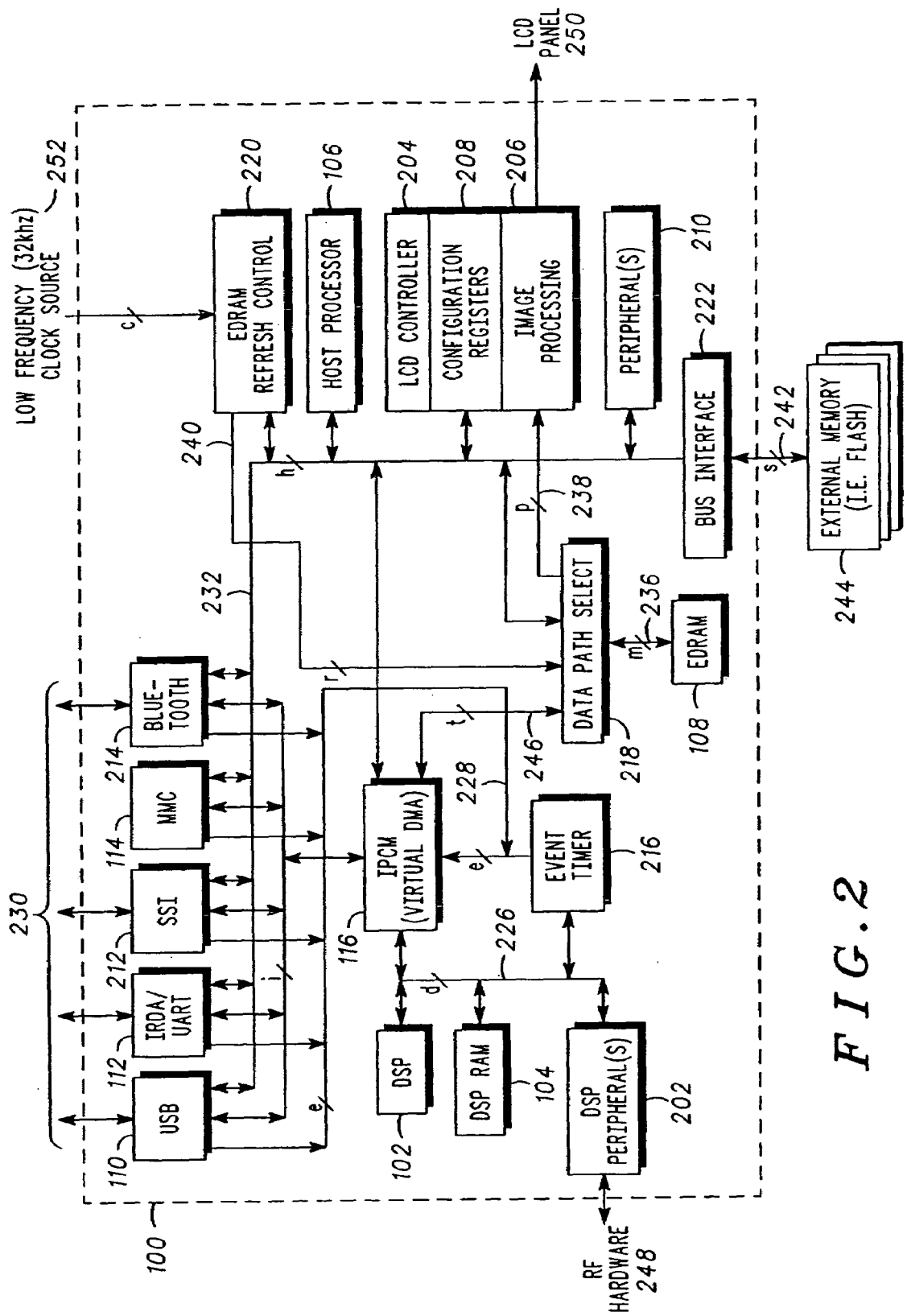
FIG. 2 is a detailed block diagram of the wireless multimedia processor platform of FIG. 1.

Referring next to FIG. 2, a detailed block diagram is shown of one embodiment of the wireless multimedia processor platform of FIG. 1. Shown is the multi-media processor platform 100 including the digital signal processor 102 (DSP 102), a DSP RAM 104, DSP peripheral interface 202, the host processor 106 (also referred to as the call processor 106), the embedded DRAM 108 (eDRAM 108), an LCD controller 204 (also referred to more generically as a display controller) including image processing 206 and configuration registers 208, and host peripheral interface 210. The processor platform 100 also includes the following peripherals 230: the USB 110, the UART/IrDA 112, a Synchronous Serial Interface 212 (also referred to as an SSI 212), the MMC 114, and a BLUETOOTH wireless communication protocol compliant interface 214. Also included is the IPCM 116, an event timer 216, data path select 218 (also referred to as the data path select unit 218), an eDRAM refresh controller 220 (also referred to as refresh controller 220), and a bus interface 222.

Further included are the following busses: a clock bus 224 (also referred to as the "c" bus 224) coupled to the refresh controller 220; the DSP system bus 226 (also referred to as the "d" bus 226) coupling the DSP 102, the DSP RAM 104 and the DSP peripherals 202 to the IPCM 116; the event bus 228 (also referred as the "e" bus 228) coupling the peripherals 230 to the event timer 216 and the IPCM 116; the host system bus 232 (also referred to as the "h" bus 232) coupling the host processor to the peripherals 230 and 210, the LCD controller 204, bus interface 222, data path select 218, refresh controller 220, and the IPCM 116; the IPCM bus 234 (also referred to as the "i" bus 234) coupling the IPCM 116 to peripherals 230; the memory bus 236 (also referred to as the "m" bus 236) coupling the data path select 218 to the eDRAM 108; LCD bus 238 (also referred to as the "p" bus 238) coupling the image processing 206 to the data path select 218; the refresh bus 240 (also referred to as the "r" bus 240) coupling the refresh controller 220 to the data path select 218; an external system bus 242 (also referred to as the "s" bus 242) coupling the bus interface to, for example, external memory 244; and a transfer bus 246 (also referred to as the "t" bus 246) coupling the IPCM 116 to the data path select 218.

Also illustrated in FIG. 2, but not part of the processor platform 100, are the radio hardware 248 coupled to the DSP peripheral interface 202, the LCD panel 250 coupled to the image processing 206, the external memory 244 coupled to the bus interface 222, and a clock input 252 coupled to the refresh controller 220.

The processor platform 100 includes three processor cores: the DSP 102, the host processor 106, and a RISC processor core embedded within the IPCM 116. Advantageously, in this embodiment, the processor platform 100 is implemented as a system on a chip, although many features of the present invention are not limited to an integrated system on a chip design. The following is a brief description of several of the components of the processor platform 100.

The DSP 102, as known in the art, is interfaced via a DSP system bus 226 to a system memory, e.g. DSP RAM 104, and DSP peripheral interface 202. The DSP RAM 104 contains DSP program and data storage areas. The DSP peripheral interface 202 is used to interface the DSP core (i.e. modem) to the radio hardware 248 to implement cellular radio communications. These components are well known in the art and are commonly found in cellular telephones.

The host processor 106 is a general purpose reduced instruction set computer (RISC) processor or a complex instruction set computer (CISC) processor as known in the art. The LCD controller 204 is a module containing digital logic configured to render an image onto an external LCD panel 250 from a binary bit image contained within memory, e.g. an eDRAM 108 memory array. The host peripheral interface 210 includes one or more modules containing digital logic and configured as a peripheral operated by the host processor 106. Examples of such peripheral interfaces include keyboard interface, general purpose timer, and general purpose I/O ports.

Also included are multimedia peripherals 230. The USB 110 is a logic block configured as a peripheral implementing the media access layer functions of the open standard known as the Universal Serial Bus. The module is configured with 2 interface ports: a port interfaced to the host processor 106 via the h bus 232 for purposes of configuration management and control and a data port interfaced to the IPCM 116 via the i bus 226 used to pass data to and from the external serial interface.

The IrDA/UART 112 is a logic block configured as a peripheral implementing the necessary functions known in the art as a Universal asynchronous Receiver/Transmitter with an optional mode to support the IrDA standard. The IrDA/UART 112 is configured with 2 interface ports: a port interfaced to the host processor 106 via the h bus 232 for purposes of configuration management and a data port interfaced to the IPCM 116 via the i bus 236 used to pass data to and from the external serial interface.

The SSI 212 is a logic block configured as a peripheral implementing the necessary functions known in the art as a Synchronous Serial Interface. The module is configured with 2 interface ports: a port interfaced to the host processor 106 via the h bus 232 for purposes of configuration management and a data port interfaced to the IPCM 116 via the i bus 236 and used to pass data to and from the external serial interface.

The MMC 114 is a digital interface designed for the purpose of connecting to and operating with a MULTIMEDIACARD. The MMC 114 is configured with 2 interface ports: a port interfaced to the host processor 106 via the h bus 232 for purposes of configuration management and a data port interfaced to the IPCM 116 via the i bus 236 and used to pass data to and from the external MULTIMEDIACARD.

The BLUETOOTH wireless communication protocol compliant interface 214 is a digital interface designed for the purpose of supporting the BLUETOOTH wireless communication protocol, which has been developed as an open standard. The BLUETOOTH wireless communication protocol compliant interface 214 is configured with 2 interface ports: a port interfaced to the host processor 106 via the h bus 232 for purposes of configuration management and a data port interfaced to the IPCM 116 via the i bus 236 and used to pass data to and from an external BLUETOOTH wireless communication protocol compliant radio circuit.

The event timer 216 is a binary counter coupled to the IPCM 116 via the e bus 228 and having 'n' number of states connected to comparison logic capable of detecting a predetermined distinct state for the purpose of generating a signal when a specific state is indicated. The counter is clocked by an accurate clock source. In one embodiment, the event timer 216 can handle up to 32 events at a given time. In some embodiments, the event timer 216 may be used to signal a programmed event or direct memory access data transfer to the IPCM 116, for example, at regular intervals.

The IPCM 116 is designed to perform interprocessor and serial I/O communication employing DSP 102 processor, and the I/O peripherals 230, such as USB 110, IRDA/UART 112, BLUETOOTH wireless communication protocol compliant interface 214 and MMC 114. The IPCM 116 is strategically positioned in the architecture to enable programmable direct memory access (DMA) data transfers to/from I/O peripherals with either the host processor 106 or the DSP 102. In addition, the IPCM 116 supports data transfers between the DSP and Host itself. Thus, advantageously, the IPCM 116 behaves as a programmable DMA to transfer data into memory without involving either the DSP 102 or the host processor 106 to make the data transfer.

Within the IPCM 116 is a programmable RISC core which is programmed to perform DMA functions. A more detailed description of the inner workings of the IPCM 116 is described with reference to FIG. 3. This approach offers several advantages over non-programmable (e.g. hardware based) solutions. The programmable DMA functionality of the IPCM 116 has many benefits. First, this allows dynamic routing in that the RISC core can be programmed to perform a variety of tasks. Under programmed control, in one embodiment, the IPCM 116 can configure up to 32 simultaneous DMA data channels, each of which may be configured in any one of three directions. DMA data transfers are routed over respective ones of each of these 32 DMA data channels. For example, each data channel could be configured to as a DMA data channel for DMA data transfers between (1) a peripheral 230 to memory (e.g. DSP RAM 104 or eDRAM 108), (2) memory (e.g. DSP RAM 104 or eDRAM 108) to peripheral 230, or (3) memory (e.g. DSP RAM 104 or eDRAM 108) to memory (e.g. the other of eDRAM 108 or DSP RAM 104). Advantageously, each of these 32 programmed DMA data channels may later be reprogrammed to allow DMA data transfers between two different nodes.

Furthermore, the IPCM 116 allows more functionality in a smaller footprint. This is because the IPCM 116 replaces many separate wired DMA controllers between the various nodes, i.e. the DSP RAM 104, the eDRAM 108, and the various I/O peripherals 230. This represents a significant savings in gates or transistors needed on the die, which for handheld multimedia applications is important in minimizing processor size. Typical gate counts of DMA channels are approximately 3 k gates per channel. In this embodiment, the IPCM 116 becomes a space saving advantage when more than 6 hardware DMA channels are required. Advantageously, in this embodiment, the IPCM 116 behaves as 192 (as described above) separate DMA channels within the footprint of about 6 actual hardware DMA channels.

Additionally, the IPCM 116 is flexible and scalable. The concept lends itself to enhancements for future generation products. The flexible data routing capabilities enable additions to the basic architecture such as hardware based accelerators. Enhancements to the RISC core of the IPCM 116 include adding registers and new instructions to permit the concept to meet future needs.

Also, the programmable RISC processor core of the IPCM 116 provides a common application program interface (API) to be defined, since the programmable RISC core uses virtual control registers which are mapped into the host memory (i.e. eDRAM 108). The API can remain intact when enhancements are made to the IPCM 116 in future generations. This feature increases software reusability.

Another feature is that the IPCM 116 is provided with smart power management such that a sleep mode is entered during periods of inactivity. This is important in handheld applications where battery life is an important concern.

Yet another feature of the IPCM is that the DMA data transfers can be transferred to and from memory (e.g. either DSP RAM 104 or eDRAM 108) using little-Endian format or big-Endian format, as known in the art. This enables the IPCM 116 to communicate with different types of processors configured according to either format. For example, a DSP configured for little Endian format or a DSP configured for big-Endian format can interface with the IPCM 116.

Another component of the processor platform 100 is that since the entire system is implemented on a chip, the RAM of the host processor 106 is an on-chip memory array constructed of DRAM type bit cells as known in the art and referred to as an embedded DRAM or eDRAM 108. The array is configured as 65536 words (64 k words) of 128 bits each for a total of 67,108,846 bit cells (64M bit). The eDRAM 108 must be refreshed periodically and this function is accomplished by the refresh controller 220. The 128 bit width of the eDRAM 108 is optimized for the LCD controller 204 as will be described further below. Thus, the eDRAM 108 functions as the host processor memory and an on-chip video buffer for the LCD panel 250. Advantageously, the width of the eDRAM reduces the number of access cycles consumed by the LCD controller 204 and thereby increase the number of access cycles available to the host processor 106 and IPCM 116.

The bus interface 222 is a module containing digital logic configured to function as a memory controller as known in the art. The module supports external memory 244 interfaced to the processor platform 100 via the s bus 242. The external memory 244 includes a number of discrete memory devices such as SRAM, EPROM, FLASH and DRAM. The external memory 244 is directly accessible by the host processor 106 or indirectly accessible by the DSP 102 via the IPCM 116. This is advantageous because this enables the host processor 106 and/or the DSP 102 to upload and run applications that are too large to be stored in the respective memories of these processors. For example, the DSP 102 may upload and run voice recognition programs stored in the external memory 244. Furthermore, the bus interface 222 allows concurrent processing operations between the host processor 106, the IPCM 116 and the DSP 102; thus, implementing a multiple instruction stream, multiple data stream (i.e. MIMD) on a single integrated circuit realizing the multi-media telephone, for example.

Note that since the eDRAM 108 has its own bus, i.e. the m bus 236, instead of being a part of the host system bus or h bus 232, the host processor 106 may access the external memory 244 through the bus interface 222 while at the same time, the IPCM. 116 accesses the eDRAM 108.

The data path select 218 contains arbitration logic and a pre-programmed data multiplexer designed for the purpose of interfacing the data path of the eDRAM 108 to one of 4 entities that may request access to the array. The 4 entities which can request access to the eDRAM 108 are the host processor 106 having an access width of 32 bits, the IPCM 116 having an access width of 32 bits, the LCD Controller 204 having an access width of 128 bits, and the refresh controller 220 for performing 16 ms periodic cycle stealing refresh for 4096 rows as known in the art. In the embodiment shown, each requester has a unique data path bus width, e.g. the p bus 238 has a width of 128 bits while the i bus 246 and the h bus 232 have a 32 bit width. The data path select 218 automatically configures the appropriate data path depending on the device being granted access. As such, the data path select 218 converts the wide array of 128 bits to support popular 32 bit RISC processor cores, e.g. within the IPCM 116. In all cases the memory address presented by the requester is taken into account in order to reference the correct data elements from the array. The bus width and access modes for each requester is shown in Table 1 below.

TABLE 1

| Requestor | Data path configuration | | |
|---|---|---|---|
| | Bus width | Read/Write | Access modes |
| Host Core | ×32 | R/W | ×8, ×16, ×32 |
| IPCM | ×32 | R/W | ×8, ×16, ×32 |
| LCD Controller | ×128 | Read only | ×128 |
| Refresh Controller | 0 | Special refresh cycle | Invokes 4096 bit cells |

Furthermore, in one embodiment, the data path select 218 always stores and retrieves data to and from the eDRAM 108 using the big-Endian format. However, since the IPCM is configured to operate in either little-Endian format or big-Endian format, if the IPCM is operating according to the little-Endian format, the data path select 218 converts the data to and from the IPCM according to the little-Endian and to and from the eDRAM into big-Endian format. As such, the IPCM must inform the data path select which format it is configured as.

The refresh controller 220 generates memory requests to the eDRAM 108 in order to facilitate periodic cycle refresh of the bit cells within the eDRAM array. However, in preferred embodiments of the present invention, the method of refreshing the eDRAM 108 is performed in such a manner as to minimize power consumption in ways not contemplated by known refreshing techniques. Several specific refreshing techniques that are designed to conserve power consumption are described with reference to FIGS. 7-9.

The following is a description of the various bus interfaces. The clock bus 224 ("c" bus) is a clock input line used to sequence and time the refresh controller 220. The DSP system bus 226 ("d" bus) contains a separate address and data path along with control signals to convey read and write operations to the selected device. In addition, a bus request and bus acknowledge signal is also incorporated to allow the IPCM 116 to request use of the DSP system bus. The event bus 228 ("e" bus) is a group of signals driven by the peripherals 230 and sent to the input event detection device of the IPCM 116 (see FIG. 3) for the purpose of activating a data movement operation. The host system bus 232 ("h" bus) contains a separate address and data path along with control signals to convey read and write operations to the selected device. The h bus 232 can operate independently from all other buses. In addition, a bus request and bus acknowledge signal is also incorporated to allow the IPCM to request use of the h bus 232. The IPCM bus 234 ("i" bus) is the IPCM system bus containing a separate address and data path along with control signals for signaling read and write operations to a specified peripheral 230. The memory bus 236 ("m" bus) is a bi-directional bus and is used to interconnect the eDRAM 108 with the data path select 218 module. The memory bus 236 has a bus width of 128 bits. The LCD bus 238 ("p" bus) is a unidirectional bus having a width of 128 bits and is used to move display image samples to the LCD controller 204 for display on the LCD panel 250. The refresh bus 240 ("r" bus) is a bus that, when asserted, contains the address of the next row to be refreshed in the eDRAM 108 array. The external system bus 242 ("s" bus) contains a separate address and data path along with control signals to convey read and write operations to the selected external memory 244. The external system bus 242 is accessible by the host processor 106 or the IPCM 116. The transfer bus 246 ("t" bus) conveys access requests from the IPCM 116 to the eDRAM 108 array. The transfer bus is bi-directional and has a 32 bit data path and a 32 bit address path.

Another feature of the eDRAM 108 is that it provides an on-chip video buffer as well as being the RAM for the host processor 106. Advantageously, the eDRAM 108 is 128 bits wide, in order to accommodate the LCD controller 204. If the eDRAM were 32 bits wide, which would be customary to support common RISC processor cores and host processors, the eDRAM 108 would be dominated by requests from supporting the LCD controller 204, such that the other devices using the eDRAM would have to compete with the LCD controller 204. Thus, the LCD controller 204 would essentially become the primary user of the eDRAM and the IPCM 116 and the host processor 106 would become secondary user. By providing a very wide buffer that is the same width as the LCD bus 238, the LCD controller 204 only briefly accesses the eDRAM 108 allowing the IPCM 116 and the host processor 106 to become the primary users of the eDRAM 108. Thus, configuring the eDRAM at 128 bits wide, the LCD controller only uses about 2-3% of the eDRAM capabilities, advantageously leaving 97% to the other devices using the eDRAM. Note that the data path select 218 allows for the differently sized busses to access the eDRAM 108.

The fact that the eDRAM 108 doubles as the system memory and the video buffer further reduces space on the processor platform 100. If a separate dedicated video buffer was employed, such as traditionally done, this separate video buffer would occupy additional space on the processor platform or be a separate integrated circuit wired to the LCD controller 204, which would take up even more space and introduce losses in the wiring. In contrast to conventional discrete video buffers, the eDRAM 108 of the processor platform 100 acts as both the system memory and the video buffer within a small footprint.

The following describes various other features of the IPCM 116.

Since the IPCM allows DMA data transfers from the peripherals mapped to the IPCM bus 236 to the either the DSP RAM 104 or the eDRAM 108, the IPCM allows these peripherals 230 to be used by the DSP 102 and/or the host processor 106. For example, a data storage device, such as the MMC 114 is accessible to the DSP 102 or host processor 106. Thus, MP3 formatted data may be streamed from the MMC 114 to the DSP 102 to affect an Internet audio player. Other applications include using the IPCM to write or read data files located on the MMC 114 by the host processor 106. Furthermore, the IPCM can be configured to move digital audio samples to and from the DSP RAM 104 to a pair of USB isochronous ports; thus, realizing a speakerphone. Additionally, the IPCM 116 supports multiple data streams originating and/or terminating from either the eDRAM 108 or the DSP RAM 104. The data transfers from each of the eDRAM 108 and the DSP RAM 104 may be performed independently of each other.

Additionally, since the IPCM 116 contains a RISC processor core (described in more detail with reference to FIG. 3), it is smart programmable. Thus, program tasks can be off-loaded from the host processor 106 via DMA data transfers from the eDRAM. For example, the IPCM 116 may perform "bit-blit" tasks, normally performed by the host processor 106. "Bit-blit" tasks, as known in the art of computer graphics, involve altering the background displays of a visual display or causing images to "fly" across a visual display. The IPCM 116 can load the necessary program from the host processor 106 to perform such tasks, instead of the host processor 106 so that the host processor 106 is free to perform other tasks.

Another application would be to off-load the host processor 106 or the DSP 102 from performing packet protocol framer functions such as "PPP" or the "LAP layer" function used in the IrDA standard. Again, advantageously the host processor 106 and the DSP 102 do not have to perform these functions.

In one embodiment, the IPCM 116 supports an external MPEG decoder coupled to either the SSI 212 or the UART/IrDA 112 by sending packets to the decoder under the control and supervision of the host processor 106. The IPCM 116 retrieves the decoded pixel data from the external MPEG decoder and deposits the pixel data into the video buffer area allocated within the eDRAM 108. As such, a "picture-in-desktop-window" is provided to the LCD panel 250.

The IPCM takes advantage of the event timer 216 so that programmable DMA data transfers can be activated according the event timer 216, in addition to being activated by events triggered by the respective peripherals and/or the DSP 102 and/or the host processor 106. Thus, pre-programmed DMA data transfers will automatically occur at predetermined times.

Furthermore, in order to minimize power consumption, the IPCM is designed to enter a low power mode (i.e. sleep mode) when no events are pending. Thus, the IPCM 116 will not unnecessarily drain battery life in between DMA data transfers.

InterProcessor Communication Module (IPCM)

Figure 3:
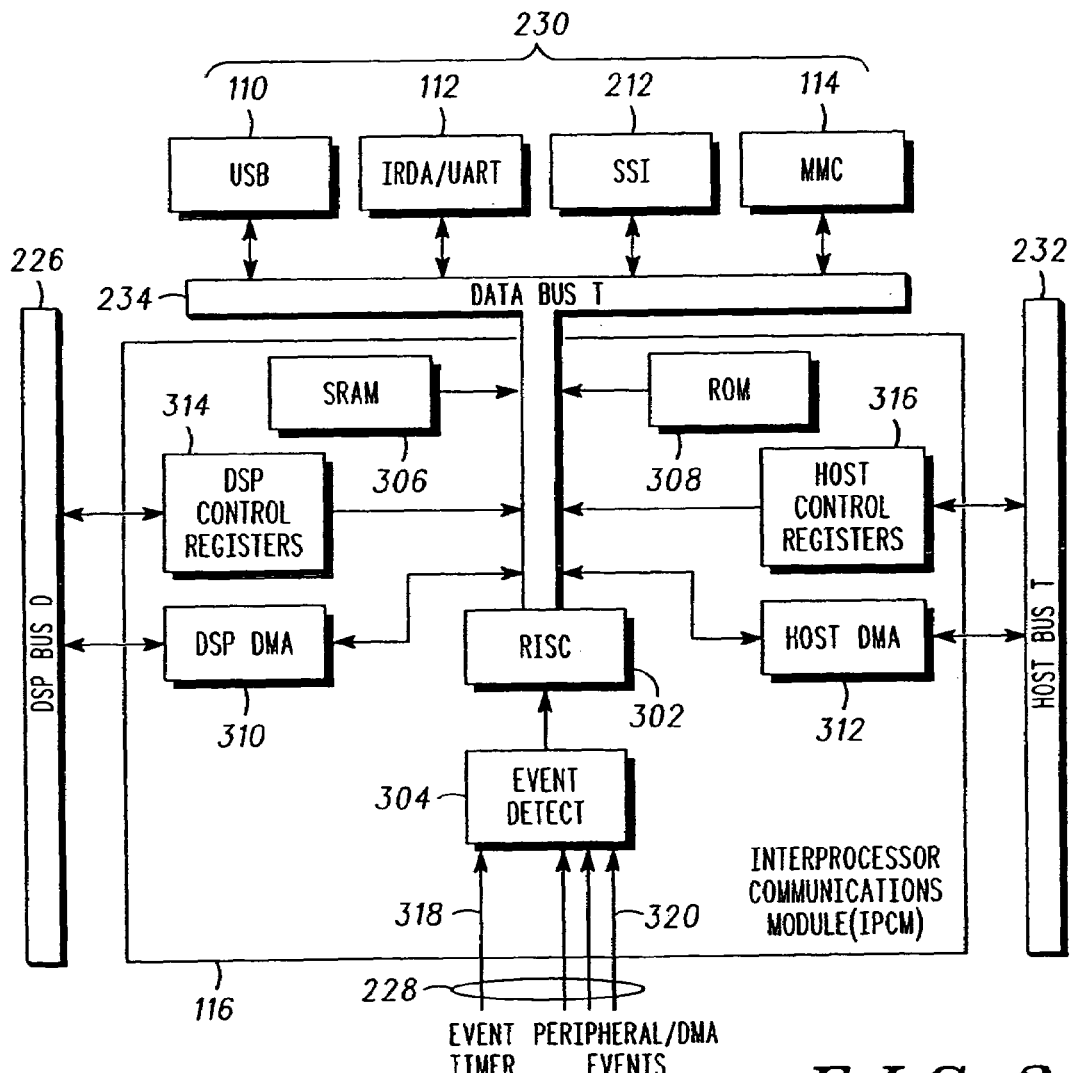
FIG. 3 is a block diagram of the interprocessor communication module (IPCM) of the wireless multi-media processor platform of FIGS. 1 and 2.

Referring next to FIG. 3, a block diagram is shown of the interprocessor communication module (IPCM) of the wireless multimedia processor platform 100 of FIGS. 1 and 2. Shown is the IPCM 116 (also referred to as a "programmable direct memory access module") including a RISC processor core 302 (also referred to as a RISC core of more generally as processor 302), an event scheduler 304 (also referred to as an event detect unit 304, a task scheduler 304 or a programmable task scheduler 304), static RAM 306 (also referred to as SRAM 306), read only memory 308 (also referred to as ROM 308), DSP direct memory access unit 310 (also referred to as DSP DMA unit 310), a host direct memory access unit 312 (also referred to as a host DMA unit 312), DSP control registers 314 (also referred to as DSP control unit 314), and host control registers 316 (also referred to as host control unit 316). Also shown are the DSP system bus 226 ("d" bus 226), the host system bus 232 ("h" bus 232) the IPCM bus 234 ("i" bus 234), and the peripherals 230 including the USB 110, IrDA/UART 112, SSI 212 and MMC 114. Also shown are the event timer input 318 and peripheral/DMA event inputs 320 into the event scheduler 304 via the event bus 228 ("e" bus 228).

The DSP control registers 314 and the DSP DMA unit 310 are coupled to the d bus 226 via a bus interface. The host control registers 316 and the host DMA unit 312 are coupled to the h bus 232 via a bus interface. The IPCM 116 also includes the i bus 234 which couples to the various peripherals 230. Within the IPCM 116, the RISC processor core 302, the SRAM 306, the ROM 308, the DSP control registers 314, the DSP DMA unit 310, the host control registers 316 and the host DMA unit 312 are all coupled to the i bus 234. Both the DSP DMA unit 310 and the host DMA unit 312 each comprise a bus transceiver portion of a conventional DMA controller. The event scheduler 304 is coupled to the processor 302. Inputs to the event scheduler 304 are the event timer 318 and the peripheral/DMA events 320.

In operation, the IPCM 116 is provides interprocessor and serial I/O data transfers employing direct memory access (DMA) techniques without actually implementing individually dedicated hardware DMA channels for all the various possible data transfer paths. Advantageously, by providing the IPCM 116 to perform these DMA data transfers, both the host processor and the DSP are relieved of such tasks and can perform more important tasks. Advantageously, and in contrast to traditional DMA circuits (also referred to as DMA controllers) that establish hardwired unidirectional DMA data channels, the IPCM 116 is a programmable DMA module that provides programmable DMA data channels that may be programmed to perform any one of three types of data transfers: (1) from a selectable peripheral 230 to either of two memories (e.g. DSP RAM 104 or eDRAM 108), (2) from either of two memories to a selectable peripheral 230, and (3) between the two memories. Thus, the IPCM 116 configures, for example, 32 programmable DMA data channels, each one which can be configured for one of the six types of data transfers. Advantageously, within the physical footprint of approximately six conventional hardware DMA controllers as known in the art, in one embodiment, the IPCM 116 replaces 192 individual DMA controllers and has the ability to configure 32 out of 192 possible DMA data channel configurations at any given time. Each of these 32 programmed DMA data channels are then used for DMA data transfers. Furthermore, these 32 data channels may then be re-configured to a different 32 out of the 192 possible DMA data channel configurations at a later time or as needed. This proves very valuable and flexible in space conscious applications, such as in handheld devices.

In one embodiment, one of the 32 DMA channels is reserved as a control channel from the host processor 106 to the IPCM 116. Thus, the IPCM 116 can configure 31 DMA data channels out of 186 possible DMA data channel configurations. Advantageously, this control channel allows the host processor to be able to send a control message to the IPCM to reconfigure one or more of a set of 31 configured DMA data channels into another one of the 186 possible DMA data channel configurations. Even if there is no control channel, the entire set of 32 configured DMA data channels may be dumped and reconfigured by the host processor.

In order to accomplish this programmable DMA data transfer capability, the IPCM 116 includes a RISC processor core 302 and also ROM 308 and the SRAM 306. In some embodiments, the RISC processor core 302 comprises a microRISC processor core. The RISC processor core 302 is used to execute short routines or instructions (stored in SRAM 306) which perform DMA data transfers. A specific example, of a custom RISC processor core and its instruction set are further described later in this specification. Also included are a pair of DMA units, DSP DMA unit 310 and host DMA unit 312, interface with the RISC processor core 302 and use specialized, dedicated registers for all DMA transfers. Thus, the DSP DMA unit 310 and the host DMA unit 312 comprise the bus transceiver portion of a conventional DMA controller. The address register, data register and counter, for example, of the conventional DMA controller are implemented within the RISC processor core 302. As such, the respective DSP DMA unit 310 and the host DMA unit 312 each represent two wired data paths to and from the RISC processor core 302 and the respective busses, e.g. d bus 226 and h bus 232.

The ROM 308 contains startup scripts (i.e. boot code) and the other common utilities which are referenced by scripts that reside in the SRAM 306. An example set of ROM scripts are attached in Appendix B. The SRAM 306 is divided into a processor context area and a code space area used to store channel scripts. Channel scripts are downloaded into SRAM 306 from the eDRAM or from external memory by the IPCM 116 using the host DMA unit 312. Downloads are invoked using command and pointers provided by the host processor. Each programmable or "virtual" DMA data channel can be configured independently on an "as needed" basis under the control of the host processor. This permits a wide range of IPCM functionality while using the lowest internal memory footprint possible. Microcode routines can be stored in an external memory, e.g. a large capacity Flash memory, and downloaded when needed.

The task scheduler 304 is a programmable scheduler that receives requests from the peripherals 230, host processor 106, and DSP RAM 102 for DMA data transfers. These requests are in the form of "events" detected on the e bus 228. An event is a condition that arises that controls the operation of a particular programmable DMA data channel. For example, an event is an indication from one of the peripherals, the host or the DSP (e.g. peripheral/DMA event inputs 320) that a DMA data transfer is desired. An event may be a signal from the host processor alerting the IPCM to re-program a specific DMA data channel. An event may also be a timed indication from the event timer (i.e. event timer inputs 318) that a DMA data transfer is to take place. For example, depending on which line of the e bus 228 an event is detected on, the task scheduler 304 can tell who is making the request or indicating that a DMA transfer is desired. The task scheduler 304 prioritizes and manages the requests. The task scheduler 304 monitors and detects external events for DMA data transfers, and maps the event (e.g. signal indicating a DMA data transfer is to be performed) to a particular DMA data channel. The events are mapped as DMA data transfers within a specific DMA data channel according to a priority such that higher priority data transfers will occur before lower priority DMA data transfers. Furthermore, the task scheduler 304 is capable of performing "priority-based preemption" in which a particular DMA data transfer currently being executed by the IPCM is interrupted (i.e. paused) so that a higher priority DMA data transfer may be executed. Once the higher priority DMA data transfer has been completed, the DMA data transfer having been interrupted is then resumed, unless another higher priority DMA data transfer is requested. Priority-based preemption is known to processors generally; however, conventional DMA controllers are hardware-based (i.e. non-programmable) and thus, not capable of such preemption. Advantageously, this embodiment provides priority-based preemption in a programmable DMA system.

The following is a brief description of the data flow in the different types of programmable DMA data transfers supported by the IPCM.

1. Peripheral to Memory

In operation, the various peripherals 230 are responsible for gathering data to be input into the processor platform. When data has arrived at the particular peripheral, for example, at the MMC 114, the peripheral signals an event to the task scheduler 304 of the IPCM 116 via the event bus 228. The task scheduler 304 is able to handle 32 events at any given time. The event is prioritized by the task scheduler 304 and mapped to a particular DMA data channel. Once the event is to be executed, the RISC processor core 302 runs software in the form of scripts located in the SRAM 306. The software is specific to the particular DMA data channel and configures the particular DMA data channel. The software effectively disciplines the RISC processor core 302 to affect the DMA data transfer from the specific peripheral to the memory destination, e.g. either the eDRAM or the DSP RAM. The DMA data transfer is performed by the software in the RISC processor core 302 such that the data in the peripheral travels to the respective memory via the i bus 234 and the respective DMA unit, e.g. either the DSP DMA unit 310 or the host DMA unit 312.

Advantageously, the DMA data transfer occurs without involvement of the either the DSP or the host processor. Furthermore, by using the IPCM 116 which includes the RISC processor core 302 and a single hardware DMA circuit, e.g. host DMA unit 312, many different DMA data paths are established through a single hardwired DMA unit. Each of these data paths are referred to as a programmable DMA data channel or a "virtual" DMA data channel. For example, there may be a DMA data channel or path from the USB 110 to the DSP RAM 104 and another DMA data channel or path from the SSI 212 to the DSP RAM 104, both of which travel through the DSP DMA unit 310. Advantageously, either DMA data channel may be later reconfigured as a different DMA data channel, e.g. from the MMC 114 to the DSP RAM 104. Thus, each peripheral to memory DMA data channel utilizes either the DSP DMA unit 310 or the host DMA unit, but may be may be programmably selectable as from any one of the peripherals coupled to the IPCM 116.

2. Memory to Peripheral

This type of DMA transfer is opposite the first type in that the transfer is from the memory of one of the processor cores of the processor platform, e.g. the DSP RAM or the host processor memory (e.g. eDRAM) to one of the peripherals 230. The DSP, via the DSP control registers 314, signals an "event" (data transfer) to the task scheduler 304, which prioritizes the event and maps it to a DMA data channel and signals to the RISC processor core 302 to perform the data transfer. The information provided by the DSP indicates a location in the DSP RAM that the data is stored and how much data to transfer. Then, the RISC processor core 302 runs software in the form of scripts located in the SRAM 306. The software is specific to the particular DMA data channel. The software effectively disciplines the RISC processor core 302 to affect the DMA data transfer from the DSP RAM 104 to the particular peripheral 230. The transfer is performed by the software in the RISC processor core 302 such that the data is copied from the DSP RAM into registers within the DSP DMA unit, then transferred to the peripheral via the i bus 234.

3. Memory to Memory

A third type of DMA data transfer is memory to memory. For example, in the event data is to be transferred from the DSP memory (e.g. DSP RAM 104) to the host processor memory (e.g. eDRAM 108), the DSP would assert an event to the task scheduler 304 of the IPCM 116. The task scheduler 304 recognizes the event, prioritizes it and then causes the RISC processor core 302 to load scripts from the SRAM 306 to affect a DMA data transfer from the DSP RAM to the RISC processor core 302 itself via the DSP DMA unit 310. For example, the data is temporarily placed into registers within the RISC processor core 302. Then, a DMA data transfer is performed between the RISC processor core 302 and the host processor memory (e.g. eDRAM 108) via the host DMA unit 312. This is effectively a "back to back" DMA data transfer. The IPCM 116 resolves differences in a memory sizes. For example, if the DSP RAM is 16 bits wide and the host processor memory is 32 bits wide, the IPCM will gather 16 bit words and pack them into 32-bit words, then transfer the 32-bit words to the host processor memory.

Once the complete "back to back" DMA data transfer has taken place from the DSP RAM to the host processor memory via the RISC processor core 302, the IPCM 116 will signal to the host processor to inform it that there is data stored in its memory. In other words, the RISC processor core 302 sends a control signal via the host control registers 316 to the host processor, giving the host processor a location pointer to an address in the host processor memory where the data begins and how many words have been placed in the host processor memory starting at that address. At that point, the host processor will retrieve the data at it's convenience. Note that most DMA data transfers are many bytes in length (e.g. 1000 bytes), requiring many iterations before a transfer complete event is signaled. This notification process is also the same in a peripheral to memory transfer, i.e. the RISC processor core 302 notifies the respective processor core, e.g. DSP or host processor, that data is waiting in memory.

This is in contrast to a processor bridge, as known in the art that allows data transfers between two processors. For example, if a host processor wanted to move data from the host to the DSP, the host would have to interrupt the DSP, wait until the DSP was ready to exchange data, then for a brief moment, the host processor would control the DSP memory in order to effect the transfer. This disadvantageously temporarily halts both the DSP and the host processor during the data transfer. Thus, the host memory and the DSP memory each stop and communicate at the same moment.

In contrast, the IPCM 116 allows a direct memory access data transfer from the host memory into the RISC processor core 302 without interrupting the DSP. The only activity required of the host processor 106 is to transmit the control signals to signal an event to the IPCM to perform the DMA data transfer of data from the host memory into the RISC processor core 302. Next, a DMA data transfer is performed from the RISC processor core 302 into the DSP memory. The DSP then retrieves the data from the DSP RAM. In this situation, neither the DSP or the host processor have to stop for the other to cause the transfer.

Figure 4:
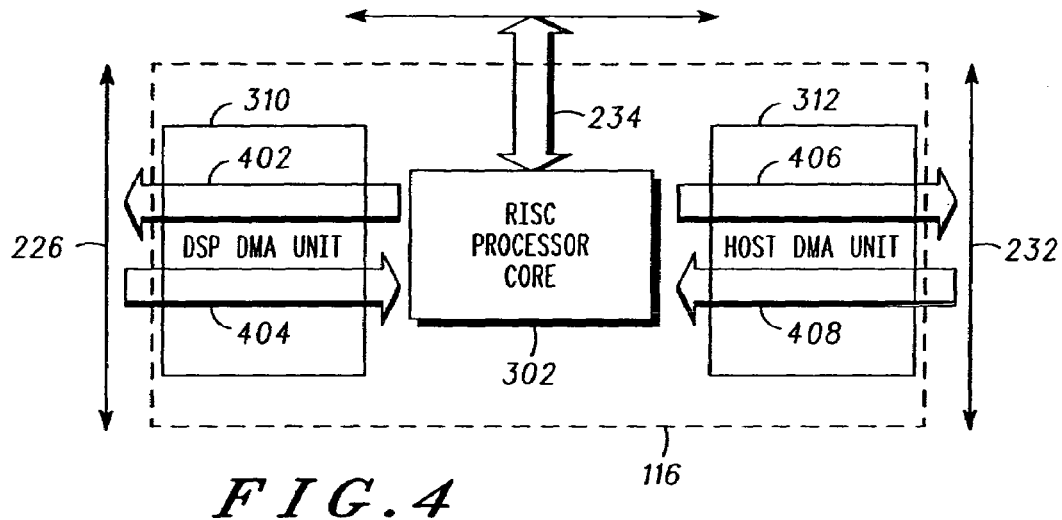
FIG. 4 is a diagram that illustrates the programmably selectable direct memory access (DMA) data channels provided by the interprocessor communication module (IPCM) of FIGS. 1, 2 and 3.

Referring next to FIG. 4, a diagram is shown that illustrates the programmably selectable direct memory access (DMA) data channels provided by the IPCM of FIGS. 1, 2 and 3. Shown are the IPCM 116, the DSP DMA unit 310, the host DMA unit 312, the RISC processor core 302, the i bus 234, the d bus 226, and the h bus 232. The DSP DMA unit 310 includes a first DSP DMA data connection 402 and a second DSP DMA data connection 404. The host DMA unit 312 includes a first host DMA data connection 406 and a second host DMA data connection 418.

The IPCM 116 includes the DSP DMA unit 310 and the host DMA unit 312. Each DMA unit 310 and 312 comprises a bus transceiver portion of a conventional DMA controller and forms 2 hardwired DMA data connections (through which programmable DMA data channels are established for DMA data transfers), one in the direction of RISC processor core 302 to memory and the other in the direction of memory to RISC processor core 302. These four DMA data connections are programmed by the RISC processor core 302 of the IPCM to act as if they together, with the RISC processor core 302, were 192 (186 if one of the DMA data channels is a control channel) actual hardware DMA controllers. In contrast, conventional DMA controllers only allow one dedicated DMA channel to be established using a DMA data connection.

In a broad sense, the RISC processor core 302 acts as a switch between devices and the various wired DMA data connections. Thus, the first host DMA channel data connection 406 may be configured or programmed as many different programmable DMA data channels, e.g., a DMA data channel from the USB 110 to the eDRAM 108, a DMA data channel from SSI 212 to eDRAM 108, and a DMA data channel from MMC 114 to eDRAM 108. These different DMA data channels utilizing the first host DMA data connection 406 may be referred to as "virtual" DMA data channels, since they effectively provide more DMA data channels than exist in hardware. Thus, the first host DMA channel 406 is programmably selectable such that it can support DMA data transfers from any one of several peripherals or from the originating node of the second DSP DMA data connection 404 to a memory at the destination end of the first host DMA data connection 406, e.g. the eDRAM 108. Thus, the RISC processor core 302 and a single DMA unit, e.g. host DMA unit 312, replace many separately wired conventional DMA controllers.

Likewise, the second host DMA data connection 408 may be programmably selectable into "virtual" DMA data channels from the originating end or node (e.g. eDRAM 108) and to any one of several peripherals or to the destination node of the first DSP DMA data connection 402. These virtual DMA data channels each utilize the second host DMA data connection 408. Furthermore, a "back to back" DMA data channel may be affected through the second host DMA data connection 408 and the first DSP DMA data connection 402 via the RISC processor core 302.

Custom RISC Processor Core/IPCM

It is noted that the RISC processor core may be a standard RISC processor as is known in the art. However, custom RISC processors may be designed which may improve performance in the IPCM 116. The following is a description of a specific embodiment of a custom RISC processor core and IPCM for use as the IPCM of FIGS. 1-4.

The custom RISC processor core 302 is a 32-bit register architecture with 16-bit instructions. There are 8 general purpose 32-bit registers, 4 flags (T, LM, SF, and DF) and PCU registers (PC, RPC, SPC, and EPC) as known in the art. The RISC processor core 302 is a two stage pipeline and also includes ROM 308 and the SRAM 306. The ROM 308 is 1 k byte (configured as 256×32) and the SRAM 306 is 8 k byte (configured as 2048×32).

The custom RISC processor core 302 (hereinafter simply referred to as the RISC processor core 302) is used to execute short routines which perform DMA data transfers. The instruction set (stored in SRAM 306) is comprised of single cycle instructions with the exception of Load/Store, CRC, DMA, and branch instructions which take two, or more cycles, to execute. A preferred instruction set is provided in Appendix A, which is attached hereto. The i bus 234 supports a 32-bit data path and a 16-bit address bus. A pair of DMA units, DSP DMA unit 310 and host DMA unit 312, interface with the RISC processor core 302 and use specialized, dedicated registers for all DMA transfers.

The ROM 308 contains startup scripts (i.e. boot code) and the other common utilites which are referenced by scripts that reside in the SRAM 306. The SRAM 306 is divided into a processor context area and a code space area used to store channel scripts. Channel scripts are downloaded into SRAM 306 from the eDRAM or from external memory by the IPCM 116 using the host DMA unit 312. Downloads are invoked using command and pointers provided by the host processor. Each programmable or "virtual" DMA data channel can be configured independently on an "as needed" basis under the control of the host processor. This permits a wide range of IPCM functionality while using the lowest internal memory footprint possible. Microcode routines can be stored in an external memory, e.g. a large capacity Flash memory, and downloaded when needed.

The task scheduler 304 is responsible for monitoring and detecting external events, mapping events to DMA data channels (also referred to simply as channels) and mapping individual channels to a pre-configured priority. At any point in time, the task scheduler will present the highest priority channel requiring service to the IPCM 116. A special IPCM core instruction is used to "conditionally yield" the current channel being executed to an eligible channel that requires service. If, and only if an eligible channel is pending will the current execution of a channel be pre-empted. There are two "yield" instructions that differently determine the eligible channels: in the first version, eligible channels are pending channels with a strictly higher priority than the current channel priority; in the second version ("yieldge"), eligible channels are pending channels with a priority that is greater or equal to the current channel priority. The task scheduler 304 detects devices (e.g., channels) needing service through the 32 input event port (the event timer input 318 and the peripheral/DMA events 320). After an event is detected, and only if it is mapped to a channel, the channel event is latched into the "Channel Pending (EP)" register. The priorities of all pending channels are combined with control bits set by the host processor and the DSP and continuously evaluated in order to update the highest pending priority. Each bit in the channel pending register is cleared by the channel script software when the channel service routine has completed.

The Host Control module (i.e. host control registers 316) contains several small RAM blocks organized as an array which are used to control (i.e., channel mapping) the 32 individual channels. The Channel Enable Register is the largest RAM array (32 bits×32 bits) and is used to map events to a specific channel(s). The second array is the Priority RAM and is used to assign channels to a programmable 1-of-7 level priority.

The 32 event inputs connected to the task scheduler via the e bus 228 come from a variety of sources and are analogous to interrupt request signals. The receive register full and transmit register empty events that are found in UART and USB ports are typical examples of signals connected to the Event Port on the IPCM. Some of the event inputs are sourced from the Layer 1 timer (e.g. event timer 304). Within the Layer 1 timer are register based compare/capture blocks which can be used to signal an event for a unique, momentary state of the Layer 1 timer. These events can be used to trigger a specific IPCM channel or channels. This feature can be used to realize a "just-in-time" data exchange between the two processors (e.g. DSP and host processor) to relax the requirement to meet critical deadlines.

The embedded nature of the IPCM requires on-chip debug capability to assure product quality and reliability and to realize the full performance capabilities of the core. The OnCE compatible debug port includes support for setting breakpoints, single step & trace and register dump capability. In addition, all memory locations are accessible from the debug port.

The IPCM 116 has two memory spaces: one for the instructions and one for the data; as both spaces share the same resources (ROM and RAM devices), the system bus manages possible conflicts when the IPCM accesses the same resource for both instruction read and data read or write.

Instructions, that are 16-bit wide, are stored in 32-bit wide devices and are also accessible as data. The correspondence is Big Endian: an even instruction address (terminated by '0') accesses the Most Significant part of the 32-bit data (bits [31:16]) and an odd instruction address (terminated by '1') accesses the Least Significant part of the 32-bit data (bits [15:0]).

Instructions can be fetched from the IPCM ROM and RAM. The ROM, RAM, peripherals (USB, UART1, UART3, MMC and VSAP) and memory mapped registers are accessible as data.

The task scheduler 304 is a hardware based design used to coordinate the timely execution of 32 programmable selectable DMA data channels (virtual DMA channels) by the IPCM on the basis of channel status and priority. The task scheduler performs the following functions: (1) monitors, detects, and registers the occurrence of any one of the 32 event inputs provided; (2) links a specific event input to a specific channel or group of channels (channel mapping); (3) ignores events which are not mapped to a previously configured channel(s); (4) maintains a list of all channels requesting service; (5) assigns a pre-programmed priority level (1 of 7) to each channel requesting service; and (6) detects and flags overrun/underrun conditions.

A programmable DMA data channel or virtual DMA data channel (hereafter simply called a channel) manages a flow of data through the IPCM 116. Flows are typically unidirectional, but are reconfigurable or reprogrammable. The IPCM can have 32 simultaneously operating channels, numbered 0 to 31. Channel 0 is dedicated for use by the host processor 106 to control the IPCM 116. All other channels can be assigned by the host processor software.

An event is a condition that arises which can control the operation of a channel. Events may be caused by externally (i.e., external to the IPCM) controlled conditions (e.g., UART receive FIFO reaches a threshold) or by the firing of internal timers (e.g. the event timer). The IPCM will implement at most 32 events, which occur randomly with respect to each other. Thus, events are designed to arrive at the task scheduler randomly while the task scheduler can handle 32 events at any one time.

The task scheduler 304 maps events to channels and prioritizes events. A channel can stall waiting on a single event. A single event can awaken more than one channel (e.g., the L1 timer). The mapping from an event to the channels it affects is under program control. There is a register for each of the 32 events which contains a bit map. There is 1 bit for each channel, which determines which channels are awakened by the event. There is also a register for each of the 32 channels which contains the priority at which the channel will operate.

A hardware scheduling block implements a scheduling algorithm such that, when a script executes an instruction that allows rescheduling, the highest priority script that has a pending event will be run.

Multiple channels may be runnable at any given time. The task scheduler 304 (hardwired logic) picks the highest priority channel to run when the current channel yields. Yielding channels may block on an external event or awaiting intervention by the host processor 106 or signal processor 102. The I-th channel is runnable only if the following is true;

(HE[i]||HO[i]) & (DDE[i]|DO[i]) & (EP[i]|EO[i])

The host enable bit HE[i], for each channel may be set or cleared by the host processor. It can be cleared by a script.

The host override enable bit, HO[i], for each channel may be set or cleared by the host processor. By setting this bit, the host processor 106 may allow channels that do not involve it, like a communication between the DSP 102 and a peripheral 230.

The dsp enable bit, DE[i], which is set or cleared by the dsp. It can be cleared by a script.

The dsp override bit, DO[i], which is set or cleared by the host processor. By setting this bit, the host processor can prevent the DSP from stalling a channel. This will be the case when a channel transfer does not involve the DSP.

The event pending bit, EP[i], which is an output of the task scheduler. It can be cleared by a script. It also can be set by the host to override the event/channel connection matrix.

The event override bit, EO[i], which is set or cleared by the host processor. By setting this bit, the host processor may prevent a channel from stopping to await peripheral events. This will be the case when the channel is not handling i/o events, e.g., a host processor to DSP DMA data transfer.

All of the HE[i], HO[i], DE[i], DO[i], ER[i], and EO[i] are set to zero on reset.

The IPCM 116 can clear the HE[i], DE[i], and EP[i] bits by means of the done instruction or the notify instruction. The done instruction causes a reschedule while the notify instruction does not. The done and notify instructions can clear one (and only one) of the following bits:

HE[I], DE[I], or EP[I]

When several channels with the same priority are eligible; the hardwired selection tree will automatically select the channel with the highest number: i.e., if channel 7 and channel 24 with priority 4 are both pending, channel 24 will be next channel to run.

In the case of the "yieldge" instruction (i.e. yield if greater or equal), and channels with the same priority as the current channel are pending, the behavior is driven by the hardwired selection tree as described above. For example, given three channels (i.e. 7, 23 and 29) that have the same highest priority.

Channel 7 is active and runs a "yieldge"; it is preempted by channel 29; after a while channel 29 runs a "yieldge", it is then preempted by channel 23 that is the selected channel as channel 29 does not belong to the selectable channels because it is the current channel. Later on, channel 23 runs a "yieldge"and is preempted by channel 29. Channels 23 and 29 will go on switching after every "yieldge" until one of them terminates. It is only at that point that channel 7 becomes eligible. During that example, it is supposed that no other eligible channel is pending.

Figure 5:
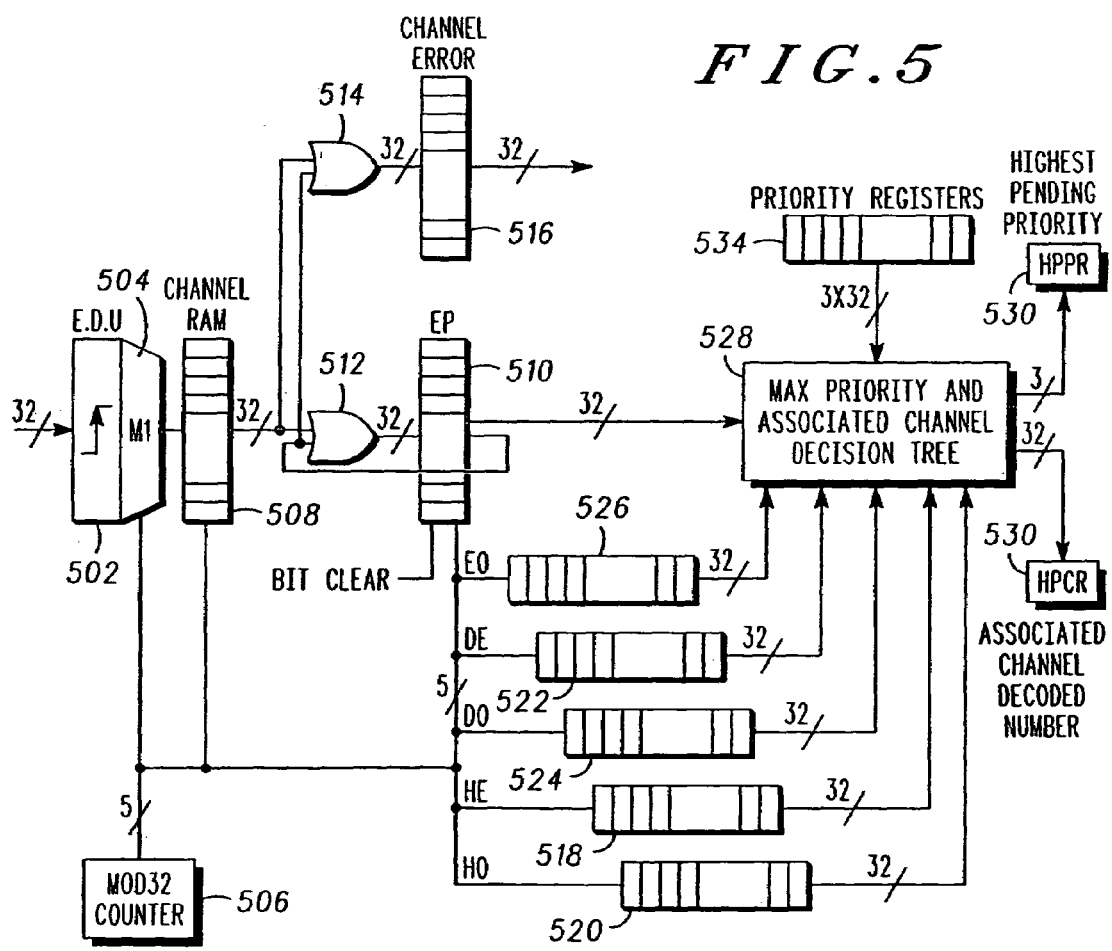
FIG. 5 is an illustration which demonstrates the functionality of the event scheduler of FIG. 2 in accordance with an embodiment of the present invention.

Referring next to FIG. 5, an illustration is shown which demonstrates the functionality of a specific embodiment of the task scheduler used in a custom RISC processor of FIG. 3 in accordance with an embodiment of the present invention. Shown is edge detection and latch unit 502, multiplexer 504, counter 506, Channel Enable RAM 508, Channel Pending Register 510 (EP which produces the event pending bit EP[i]), "OR" gate 512, "AND" gate 514, Channel Error Register 516, host enable register 518 (HE which produces the host enable bit HE[i]), host override enable register 520 (HO which produces the host override enable bit HO[i]), dsp enable register 522 (DE which produces the dsp enable bit DE[i]), dsp override register 524 (DO which produces the host override bit DO[i]), event override register 526 (EO which produces the event override bit EO[i]), decision tree 528, priority register 534, highest pending priority register 530 (HPPR), and highest pending current channel register 532 (HPCR).

The task scheduler 304 contains a 3 stage pipeline for processing and prioritizing event inputs. The first stage of the pipeline scans the event inputs and maps detected events to an active channel(s). The second stage of the pipeline maintains a list of channels requesting service (Channel Pending Register) and assigns a priority to all pending channels from the Priority RAM 534 while the third stage identifies the top priority and the associated channel.

The priority output of the task scheduler is applied to the RISC processor core of the IPCM and compared to the priority currently being executed by the RISC processor core. The core maintains the current priority in a Program Status Word (PSW). Priority-based preemption will occur if the task scheduler priority is greater than the current priority when a yield instruction is encountered.

The following text contains a description of the pipeline of the task scheduler.

The first stage (stage 1) of the pipeline contains a 32 bit edge detection and latch unit 502 placed in front of a 32×1 digital multiplexer 504 (referred to as mux or M1). The mod 32 counter 506 drives the mux 504 select input and the mux 504 sequences through 32 event inputs. A logic "1" is applied to the 32×32 entry Channel Enable RAM 508 for each corresponding logic "1" being scanned; thus mapping an event to a channel. The edge-detect latch corresponding to the event scanned is automatically cleared on the next clock cycle. A positive detect on one of the event inputs supplies a read enable signal to the Channel Enable RAM 508. An event can take up to 32 clocks to be detected. Once detected, an event can propagate from the mux 504 through the Channel enable RAM 508 in 1 clock cycle.

In the second stage, The Channel Enable RAM 508 is addressed by the same 32 bit counter 506 and is a square (32×32) array having a single bit provided for each event across each channel. A logic "1" output is produced from the channel enable RAM 508 on the data output port if a channel is enabled and the corresponding event is detected. This signal is latched into the corresponding position within the Channel Pending Register 510. The detected event propagates from the Channel Enable RAM 508 to the Channel Pending Register 510 in 2 clock cycles. The Channel Pending Register 510 (EP) is a 32 bit register having one bit for each of the 32 channels. Note that the number of channels asserted to the Channel Pending Register 510 on any given clock cycle is determined by the number of bits set to "1" in the 32 bit mask corresponding to the address selected by the 5 bit counter. An "OR" gate 512 is used to provide "present state feedback" to trap and hold a detected event in the Channel Pending Register 510. Also note that a "bit clear" input is provided to allow the IPCM core to clear a specific bit in the Channel Pending Register 510. This operation is performed by the IPCM core through a software instruction when the corresponding channel has been serviced.

Lastly, a group of 32 "AND" gates 514 is used to detect the reassertion of an event which has not been serviced. In other words, if an event is signaled and the channel is already pending, then a corresponding bit signifying and overrun/underrun condition is latched into a Channel Error Register 516. The host processor is then signaled of any errors in the task scheduler.

In the third stage of the pipeline, the output of former Channel Pending Register 510, as well as output of EO register 526, HE register 518, HO register 520, DE register 522 and DO register 524, and the priority register 534 (which stores the current priorities) to determine which channels are enabled and have to be ordered through the decision tree 528.

This priority tree 528 will deliver, on a cycle by cycle basis, the enabled channel with the highest priority (a channel "i" is said enabled if) EP[i]|EO[i]) & (HE[i]|HO[i]) & (DE[i]|DO[i]) is set to one for this particular channel).

In case multiple enabled channels with the same priority are eligible, the first one detected will be elected (the detection starting with channel 31 and going downwards; i.e., if channel 13 and channel 24 are both eligible, channel 24 is selected).

The "tree architecture" allows dynamic modification of (EP[i]|EO[i]) & (HE[i]|HO[i]) & (DE[i]|DO[i], as well as dynamic modifications of priorities.

The propagation time is one clock from the Channel Pending Register 510 to the FIFO.

The following is a brief summary of the steps of the task scheduler of FIG. 5, referring to numbers corresponding in FIG. 5 to the portion of FIG. that performs the step.

At step 1, the Digital mux 502 scans event inputs. All inputs are edged sensed and latched until scanned. After scanning they are automatically cleared. At step 2, a bit in the Channel Pending Register 510 is "set" when the corresponding bit in the event and Channel enable register 508 map produces a positive result. At step 3, the Channel Pending Register 510 (EP) is continuously combined with bits from the EO, DE, DO, HE and HO registers, and together with the priorities, feeds the decision tree 528. At step 4, the value in the highest pending priority register 530 (HPPR) presents the highest priority currently pending service to the RISC processor core. At step 5, the Channel Error Register 516 captures occasions when a channel is pending and a another subsequent event is detected on that channel. At step 6, the IPCM core clears single bit in Channel Pending Register 510 when the channel has been serviced. Once cleared, the channel may be reasserted when another event has been detected.

On execution of a done instruction the program control unit will jump to a context switch subroutine (see Appendix B—EXAMPLE ROM SCRIPTS FOR RISC PROCESSOR CORE OF IPCM, and spill current context to memory. The "real context switch", where CCR (Current Channel Register) (not shown in FIG. 5, but located within the RISC processor core of the IPCM) changes to HPCR 532 (Highest Pending Channel Register), takes place on execution of TstPendingAndSwitch instruction, after the current context has been spilled to memory.

The context switch program (see Appendix B) can be divided into 6 parts: (1) Load current context's spin base address; (2) Spill registers of current context to memory; (3) Test Pending Channel and react appropriately (TstpendingALnd Switch); (4) Load new context's base address; (5) Download new context; and (6) Copy shadow registers.

On execution of TstPPendingAndSwitch instruction, if there is no longer an HPPR 530 (Highest Pending Priority Register) is null, due to modifications of (HE[i]|HO[i]) & (EP[i]|EO[i] & DE[i]|DO[i] or priorities modifications), the RISC core will enter its IDLE mode, else the second half of the context switch script will be executed, and the context of the elected channel will be downloaded.

In case we enter IDLE mode (i.e., in case HPCR/HPPR is empty after the context spill to memory has finished), on a new event we will continue the second half of the script and download the context of channel associated to the new event.

Once elected, Current Channel Register's status (CCR) and Current Channel Priority (CPRi) can not be modified, even if the associated (HE[i]|HO[i]) & (EP[i]|EO[i] & DE[i]|DO[i] condition transitions to zero or if the priority associated to this channel is dynamically modified by the host.

The yield (done_000) will be handled on a different way in case after the spill part of subroutine, HPCR/HPPR is empty. In this particular case, we will continue the script and download back the context we just spilled to memory.

The following portion describes several of the functional units of the IPCM 116.

In one embodiment, the custom IPCM includes a cyclic redundancy check (CRC) unit (not shown) which is coupled to the RISC processor. It can perform CRC calculation for a set of given polynomials from degree 8 to 32. The CRC unit includes two 32 bit registers: the CRC algorithm CA which selects the polynomial and the CRC checksum CS to accumulate the data after each processing.

After loading both registers to select the polynomial and initialize the calculation, the CRC unit is able to process one byte every clock cycle.

The DSP DMA unit 310 receives instructions from the RISC processor core 302. It is able to read and write data from/to the DSP memory via DMA accesses and it allows 32-bit and 16-bit transfers to the Quartz DMA.

There are two major registers used by the DSP DMA 310: the address register (DA) that contains the address of the data to read or write in the Quartz memory and the data register (DD) that contains the data itself.

Due to its prefetch and flush capabilities, the DSP DMA 310 is able to perform accesses to the Quartz memory without stalling the RISC processor core so that it can execute other instructions while the DSP DMA 310 waits for the read or write command to complete.

The host DMA unit 312 receives instructions from the RISC processor core 302 (also referred to as the IPCM core). It is able to read and write data from/to the embedded DRAM 108 or the external memory 244 via DMA accesses and it allows 32-bit, 16-bit and 8-bit transfers. The external memory 244 accesses are done through an MCORE local bus (MLB) switch.

There are two major registers used by the Host DMA 312: the address register (MA) that contains the address of the data to read or write in the Quartz memory and the data register (MD) that contains the data itself.

Due to its prefetch and flush capabilities, the Host DMA 312 is able to perform accesses to the host processor (e.g. MCORE) memory (i.e. eDRAM 108) without stalling the RISC processor core 302 so that it can execute other instructions while the Host DMA unit 312 waits for the read or write command to complete. Note that MCORE is a known host or call processor.

An IPCM bus Switch allows the host DMA unit 312 to access external memories through the MCORE's EIM module connected to the MCORE Local Bus (MLB). It also allows other devices (such as the MCORE Test module, the NEXUS module or the GEM module) to take control of the MLB.

Furthermore, The IPCM 116 internally manages two power modes: RUN and IDLE. In RUN mode, all the modules of the IPCM 116 receive a 100 MHZ IPCM clock. The IPCM 116 is in RUN mode when a channel is active.

In IDLE mode, all the channels have been serviced and no more channels are pending; this is the mode after reset. Most of the IPCM modules do not receive the 100 MHZ clock any more: the RISC processor core, the functional units and the bus arbitration logic. The task scheduler 304 continues to work as it has to sample incoming events and decide when the RISC processor core 302 should start again to service a new channel. The host control modules 316 and DSP control modules 314 that hold the control registers of the IPCM 116 still receive the 100 MHZ clock as they may be accessed by the host processor 106 or the DSP 102 while the IPCM 116 is in IDLE mode. The IDLE mode conserves power, which is important in battery operated environments.

It is also possible for the host processor to completely stop the IPCM 116 through a clock controller. In that case, no clock at all is received by the IPCM 116 and it is not possible for the IPCM 116 to restart its clock. It is up to the host processor to restore the IPCM clock. This functional mode can be useful when no data transfers are required through the IPCM 116.

After reset (either received from the reset module or a software reset required by the host processor), the IPCM 116 is in idle mode; it will start its boot code located at address 0 once a channel is activated. Activating a channel can be done by the host processor after programming a positive priority and setting the channel bit in the EVTPEND register.

It is important to notice that when the IPCM 116 is in IDLE mode, it is impossible to perform the OnCE debug actions that need to execute instructions on the core; beforehand, the IPCM must be wakened by activating a channel. One possibility is to perform a debug request through the OnCE, and then activate any channel, which will start the IPCM clock and the core will immediately enter debug mode without executing any instruction. More details can be found in the OnCE specific chapter. Another possibility is to use a JTAG module to switch off IPCM clock gating, which enables it to immediately respond and does not require to have an active channel; in that mode, clocks are always running, whatever the IPCM mode.

The following text describes the software interface used to operate the programmable DMA data channels of the IPCM 116.

Figure 6:
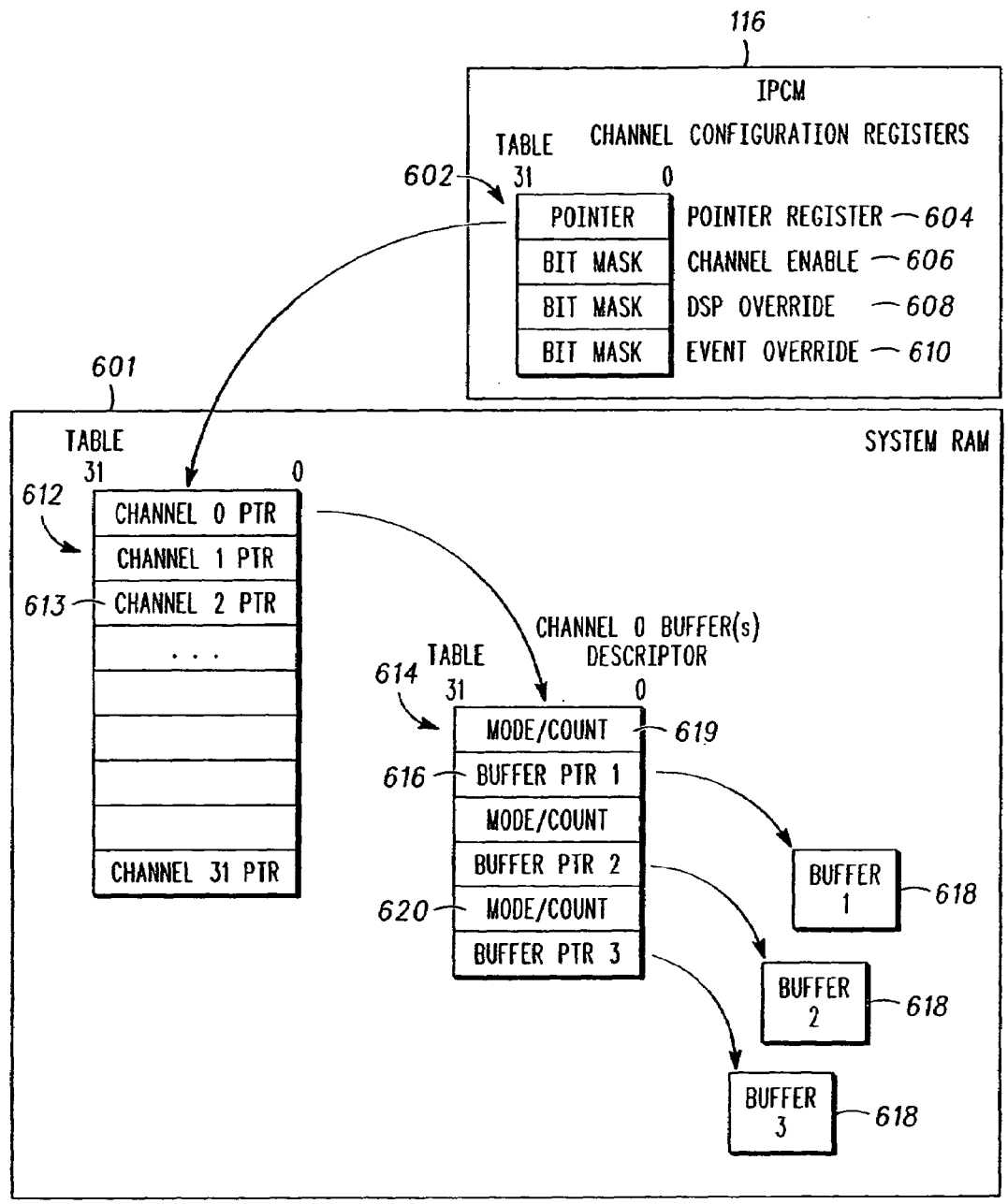
FIG. 6 is a diagram of the pointers and memory buffers within the interprocessor communication module and the host processor memory and which are used for each of the programmable direct memory access data channels.

Referring next to FIG. 6, a diagram is shown of the pointers and memory buffers within the IPCM and the host processor memory and which are used for each of the programmable direct memory access data channels. Shown is the IPCM including table 602 including a pointer register 604, a channel enable register 606, DSP override register 608 and event override register 610. Also shown is the system RAM 601 including Table 612 which includes channel pointers 613. The system RAM 601 also includes Table 614 including a buffer pointer 616, count field 619 and mode field 620. And the system RAM also includes buffers 618.

This section describes buffer management mechanism used between IPCM 116 and either the host processor 106 (also referred to as Host MCU) or DSP 102. The IPCM relies on having a minimum of one or more memory buffers for each channel that is active. These channel buffers must be located in the system RAM 601 (e.g. eDRAM 108) of the MCU and DSP (e.g. DSP RAM 104) respectively. Buffers are described and managed through the use of virtual control registers implemented as a Linked-List residing in the system RAM 601 area of the MCU and DSP. The following describes the control structure for the Host MCU port.

Table 602 is a group of hardware registers located within the IPCM 116. The pointer register 604 is a 32-bit read/write register accessible by the Host Core that contains a pointer to Table 612, which is a structure of pointers 613. The pointers 613 and 604 may reference any memory location within the system RAM 601.

System programmers should be advised that optimal performance is realized when Table 612 and Table 614 are located in the main system RAM 601 (e.g., eDRAM 108 in the case of a smart phone).

Table 612 is a fixed structure of 32 entries. Each entry represents one of the 32 IPCM DMA data channels and contains a 32-bit pointer. The IPCM 116 uses the pointer in Table 602 to find Table 612. Table 612 must be present in its entirety even when all 32 channels are not used. The IPCM 116 will not use pointer entries for channels which are not enabled (e.g., a bit set in the channel enable register 606).

It is intended that the value of the pointer(s) in Tables 602 and 612 remain "static" for the duration of the IPCM operating session.

Table 614 contains the operating command and status registers, a buffer size descriptor (e.g. count field 619) and a pointer 616 to the physical buffer 618 itself. The dedicated table 614 must be present for each of the 32 channels and is implemented as a Linked-List structure. This technique permits one or more buffers 618 to be allocated to a single DMA channel and thereby enables a variety of implementation schemes such as buffer swapping and daisy chaining.

In operation, the IPCM 116 will read the command register element of the first buffer described in the list and rise that buffer 618 until it is filled to capacity or closed by some event. The IPCM 116 will refer back to the Linked-List and open the next buffer in the list if one is declared. When the IPCM 116 reaches the end of the list, all buffers 618 will have been filled, or closed, arid the specific IPCM channel referenced by Table 614 will be shutdown. The channel may be restarted by the MCU updating the contents of Table 614 for the respective channel followed by asserting the appropriate channel enable bit in the Channel Enable Register 606 located in the IPCM.

A variety of operating scenarios are possible using the modes provided. Buffers 618 may be alternately swapped, daisy chained, or operated in modulo mode. Interrupts may be generated to the Host MCU or DSP when a specific buffer is filled, or closed, by configuring the appropriate control bit within the Mode Register.

The Mode field 620 within the structure of Table 614 contains a control bit to serve as a semaphore and referred to as the "D" bit. When set the buffer is owned by the IPCM and the count, pointer, status, and control fields must not be changed by the MCU. When D=0, the MCU owns that particular buffer and the IPCM will not attempt to write into any of the control fields or buffer space.

Note that the channel interface to Quartz DSP is similar to that of the host MCU.

Host Processor Programming Model

The host processor 106 (simply referred to as the host) controls the IPCM 116 by means of several interface registers. They are all accessed with 0 wait-state on the ip bus interface except the once command register (ONCE_CMD) that requires 1 wait-state and the CHENENBL RAM that also requires 1 wait-state. They are all clocked with the IPCM clock (which means the Host must ensure the IPCM clock is running when it wants to access any register).

Regarding read & write authorized sizes; any read puts the 32-bit contents of the register on the bus regardless of the read size (i.e., byte enables are ignored); any write updates the contents of the register according to the required size (i.e., byte enables are used to allow writing of the corresponding byte from the bus to the register) except when writing to the CHNENBL RAM that always stores the full size word on the bus (32-bit) into the RAM, regardless of the size.

Following are the registers of the host processor used in controlling the IPCM 116 in accordance with one embodiment of the invention.

C0PTR (Channel 0 Pointer). This register contains the 32-bit address, in host memory, of the array of channel control blocks starting with that for channel 0 (the control channel). The host has a read/write access, the IPCM has a read-only access. On reset, this register will be all zeros. This register should be initialized by the host before it enables a channel (e.g. channel 0).

INTR—Channel Interrupts. This register contains the 32 HI[i] bits. If any bit is set, it will cause an interrupt to the host. This register is a "write-ones" register to the host. When the host sets a bit in this register, the corresponding HI[i] bit is cleared. The interrupt service routine should clear individual channel bits when their interrupts are serviced, failure to do so will cause continuous interrupts. The IPCM is responsible for setting the HI[i] bit corresponding to the current channel when the corresponding done instruction is executed.

STOP/STAT—Channel Stop/Channel Status. This 32-bit register has one bit for each channel. This register is a "write-ones" register to the host. When the host writes I in bit i of this register, it clears the HE[i] and START[i] bits. Reading this resister yields the current state of the HE[i] bits.

START—Channel Start. This 32-hit register has one bit for each channel. This register is a "write-ones" register to the host. Neither START[i] bit can be set while the corresponding HE[i] bit is cleared. When the host tries to set the START[i] bit by writing a one, if the corresponding HE[i] bit is clear, the bit in the START[i] register will remain cleared and the HE[i] bit will be set. If the corresponding HE[i] bit was already set, the START[i] bit will be set. The next time the IPCM channel i attempts to clear the HE[i] bit by means of a done instruction, the bit in the START[i] register will be cleared and the HE[i] bit will take the old value of the START[i] bit. Reading this register yields the current state of the START [i] bits. That mechanism allows the Host to pipe-line two START commands per channel.

EVTOVR—Channel Event Override. This register contains the 32 EO[i] bits. A bit set in this register causes the IPCM to ignore events when scheduling the corresponding channel. Writing in this register overwrites the previous value.

DSPOVR—Channel DSP Override. This register contains the 32 DO[i] bits. A bit set in this register causes the IPCM to ignore DSP enable when scheduling the corresponding channel.

HOSTOVR—Channel HOST Override. This register contains the 32 HO[i] bits. A bit set in this register causes the IPCM to ignore HOST enable when scheduling the corresponding channel.

EVTPEND—Channel Event Pending. This register contains the 32 EP[i] bits. Reading this register allows the host to determine which channels have events pending. Setting a bit in this register causes the IPCM to reevaluate scheduling as if a peripheral event destined for this channel had occurred (this a 'write-ones' mechanism: writing an '0' does not clear the corresponding bit). This is useful for starting up channels, so that initialization is done before awaiting the first event. The task scheduler can also sets bits in the EVTPEND register, according to the received events. The EP[i] bit may be cleared by the done instruction when running channel I script.

DSPENMBL—Channel DSP Enable. This register contains the 32 DE[i] bits (from the DSP Control module or control registers). This register enables the host to determine which channels the DSP has enabled.

RESET—Reset Register. This register contains two control bits: (1) the reset bit (RESET[0]), when set causes the IPCM to be held in software reset. The reset has to be held some cycles before it cam be released. Actually a counter is used to keep the soft reset (soft_rstB low) active during these cycles. The soft_rstB signal is driven low as the reset bit is set. The reset bit is cleared by the IPCM. And (2) The resched bit (REST[i]), when set, forces the IPCM to reschedule. as if a script had executed a done instruction.

This allows the host to recover from a runaway script on a channel by clearing its HE[i] bit via the STOP register and then forcing a reschedule via the RESCHED bit of the RESET register. When the context switch starts. the resched bit is cleared by the IPCM.

EVTERR—Event Error Register. This register is used by the IPCM to warn the host when an incoming event was detected and it triggers a channel that is already pending or being serviced. That probably means there is an overflow of data for that channel. This is a "write-ones" register for the scheduler; it is only able to set the flags; the flags are cleared when the register is read by the Host or during IPCM reset.

Any EVTERR[i] bit is set when an event that triggers channel i has been received through the event input pins and the EP[i] bit is already set; the EVTERR[i] bit is unaffected if the Host tries to set EP[i] bit whereas that EP[i] bit is already set.

This register is NOT the same as the DSP EVTERR: when the Host reads and clears it, the same information is still available in the DSP register.

INTRMASK—Channel Interrupt Mask Flags. This register contains 32 interrupt generation mask bits. If bit INTRMASK[i] is set, the HI[i] bit is set and an interrupt is sent to the Host whenever an event error is detected on channel i (i.e., EVTERR[i] is set).

PSW—Scheduler Status. This is a 16-bit register with the following status information: [4:0]CCR (current channel register); [7:5]CCP (current channel priority); [12:8]NCR (next channel register); and [15:13]NCP (next channel priority).

EVTERRDBG—Event Error Register for Debug. This register is the same as EVTERR except reading it does not change its contents (i.e., it is not cleared); that address is meant to be used in debug mode: the MCU OnCE may check that register value without modifying it.

ONCE_ENB—OnCE Enable. That one-bit register selects the OnCE control source; when cleared (0), the JTAG controls the OnCE; when set (1), the Host controls the OnCE through the registers described below. After reset, the Once enable bit is cleared (JTAG controls).

ONCE_CMD—OnCE Command Register (1 wait state). Writing to that register will cause the OnCE to execute the written command; when needed, the ONCE_DATA and ONCE_INSTR registers should be loaded with the correct value before writing the command to that register.

CSWADDR—Context Switch Address. A 15-bit register that contains the context switch address (bits 13-0) and an enable bit (14); when the enable bit is set, the context switch routine is assumed to start at the address contained in bits 13-0. The reset value of that register is 0 for the enable bit and decimal 32 for the context switch address.

ILLINSTADDR—Illegal Instruction Trap Address. Bits 13-0 of this register contain the address where the IPCM jumps when an illegal instruction is executed; it is 0x0001 at reset.

CHN0ADDR—Channel 0 Address. This 13-bit register is used by the boot code or the IPCM: after reset, it points to the standard boot routine in ROM (channel 0 routine); by changing that address, the user has the ability to perform a boot sequence with his own routine. The very first instructions of the boot code fetch the contents of that register (it is also mapped in the IPCM memory space) and jump to the given address. The reset value is 0x0050 (decimal 80).

CHNENBL—Channel Enable RAM. The Host Control module contains a 32×32 channel enable RAM. This channel enable RAM contains the event/channel correspondence map. Any event can trigger any possible combination of channels according to the contents of that RAM.

CHNPRI—Channel Priority Registers. This set of 32 registers contains the priority of every channel; that number is comprised between 1 and 7. 0 is a reserved value used by the IPCM hardware to detect when no channels are pending.

DSP Programming Model

The DSP 102 has some limited, compared to the host processor 106 (i.e. host), control over the IPCM 116 via several interface registers. Each register occupies two 16-bit words to accommodate all 32 channels. All registers operate in the same manner as there host processor counterparts. The CEVTOVR and CDSPOVR registers are not implemented in the DSP interface.

All addresses, such as the C0PTR, are comprised of one 32-bit word that may address any location within the Quartz memory space (4 Gbytes).

All registers are clocked with the IPCM clock (which means the Host must ensure the IPCM clock is running when the DSP is supposed to access those registers).

Regarding read & write authorized sizes: any read puts the 32-bit contents of the register on the bus, regardless of the read size (i.e., byte enables are ignored); any write updates the contents of the register according to the required size (i.e., byte enables are used to allow writing of the corresponding byte from the bus to the register).

The following are the registers of the DSP used in controlling the IPCM 116 in accordance with one embodiment of the invention.

C0PRT—Channel 0 Pointer. This register contains the 32-bit address, in DSP memory, of the array of channel control blocks starting with CCB for channel 0 (the control channel). The DSP has a read/write access, the IPCM has a read-only access. On reset, this register will be all zeros. This register should be initialized by the DSP before any channels are enabled.

INTR—Channel Interrupts. This register contains the 32 DI[i] bits. If any bit is set, it will cause an interrupt to the host. This register is a "write-ones" register to the host. When the host sets a bit in this register the corresponding DI[i] bit is cleared. The interrupt service routine should clear individual channel bits when their interrupts are serviced, failure to do so will cause continuous interrupts. The IPCM is responsible for setting the DI[i] bit corresponding to the current channel when the corresponding done instruction is executed.

STOP/STAT—Channel Stop/Channel Status. This 32-bit register has one bit for every channel. This register is a "write-ones" register to the DSP. When the DSP writes a 1 in bit I of this register, it clears the corresponding DE[i] and START[i] bits. Reading this register yields the current state of the DE[i] bits.

START—Channel Start. This 32-bit register has one bit for each channel. This register is a "write-ones" register to the DSP. Neither START[i] bit can be set while the corresponding DE[i] bit is cleared. When the DSP tries to set the START[i] bit by writing a one, if the corresponding DE[i] bit is clear, the bit in the START [i] register will remain cleared and the DE[i] bit will be set. If the correspondent DE[i] bit was already set, the START [i] bit will be set. The next time the IPCM channel I attempts to clear the DE[i] bit by means of a done instruction, the bit in the START [i] register will be cleared and the DE[i] bit will take the old value of the START[i] bit. Reading this register yields the current state of the START[i] bits. That mechanism allows the DSP to pipe-line two START commands per channel.

EVTERR—Event Error Register. This register is used by the IPCM to warn the DSP when an incoming event was detected and it triggers a channel that is already pending or being serviced. That probably means there is an overflow of data for that channel. This is a "write-ones" register for the scheduler. It is only able to set the flags; the flags are cleared when the register is read by the DSP or during IPCM reset.

Any EVTERR[i] bit is set when an event that triggers channel i has been received through the event input pins and the EP[i] bit is already set; the EVTERR[i] bit is unaffected if the Host tries to set the EP[i] bit whereas that EP[i] bit is already set.

This register is not the same as the Host EVTERR. When the DSP reads and clears it, the same information is still available in the Host register.

INTRMASK—Channel Interrupt Mask Flags. This register contains 32 interrupt generation mask bits. If bit INTRMASK[i] is set, the DI[i] bit is set and an interrupt is sent to the DSP whenever an event error is detected on channel i (i.e., EVTERR[i] is set).

PSW—Scheduler Status. This is a 16-bit register with the following status information: [4:0]CCR (current channel register); [7:5]CCP (current channel priority); [12:8]NCR (next channel register); and [15:13] NCP (nest channel priority).

EVTERRDBG—Event Error Register for Debug. This register is the same as EVTERR except reading it does not change its contents (i.e. it is not cleared); that address is meant to be used in debug mode. The DSP OnCE may check that register value without modifying it.

IPCM Programming Model

Each programmable DMA data channel has eight general purpose registers of 32-bits for use by scripts. General register 0 has a dedicated function for the loop instruction, but otherwise can be used for any purpose.

Functional Unit State. Each channel context has some state that is part of the functional units. The specific allocation of this state is part of the functional unit definition. This state must be saved/restored on context switches.

Program Counter Register (PC). The PC is 14 bits. Since instructions are 16-bits in width and all memory in the IPCM is 32-bits in width, the low order bit of the PC selects which half of the 32-bit word contains the current instruction. A low order bit of zero selects the most significant half of the word (i.e. big-endian).

Flags. Each channel has 4 flags: The T bit reflects the status of some arithmetic and test instructions. It is set when the result of an addition or a subtraction is zero and cleared otherwise. It is also the copy of the tested bits. Finally it can also be set when the loop counter ((GReg0) reaches zero; when the last instruction of the hardware loop is an operation that can modify the T flag, its effect on T is discarded and replaced by the GReg0 Status.

Two additional bits, SF and DF, are used to indicate error conditions resulting from loading data sources and storing to destinations, respectively. Access errors set these bits, and successful transactions clear them. They can also be cleared by specific instructions (CLRF and LOOP. The SF (source fault) is updated by loads LD and LDF; the DF (destination fault) is updated by stores ST and STF.

Access errors are caused by several conditions: writing to the ROM, writing to read-only memory mapped register. accessing art unmapped address or any transfer error received by a peripheral when it is accessed.

The SF and DF flags have a major impact on the behavior of the hardware loop: if SF or DF is set when starting a hardware loop and it is not masked by the LOOP instruction, the loop body will not be executed; now, inside the loop body, if a load or store sets the corresponding SF or DF flag, the loop exits immediately. Testing the status of the T flag at the end of the loop (as well as testing both SF and DF) tells If the loop exited abnormally as any anticipated exit prevents Greg0 from reaching the zero value and thus setting the T flag. This is also valid if the fault occurs at the last instruction of the last loop.

The last flag is the loop mode flag, LM, which indicates when the processor is currently operating in loop mode. It is set by the LOOP instruction and is cleared after execution of the last instruction of the last loop.

Return Program Counter (RPC). The RPC is 4 bits. It is set by the jump to subroutine instructions and used by the return from subroutine instruction. Instructions are available to transfer its contents to and from a general register.

Loop Mode Start Program Counter (SPC). The SPC is 14 bits. It is set by the loop instruction to the location immediately following it.

Loop Mode End Program Counter (EPC). The EPC is 14 bits. It is set by the loop instruction to the location of the next instruction after the loop.

Context Switching. Each channel has a separate context consisting of the 8 general purpose registers and additional context representing the state of the functional units. The active registers and functional units contain the context of the active channel. The context of in inactive channels are stored in IPCM RAM which is part or the IPCM address space. A context switch stores the active registers into the context area of the old channel and loads the new context from the context area of the new channel. It exactly requires 47 IPCM cycles to complete.

It is possible to define a custom context switch routine. The user has to store it wherever possible in RAM and its start address must be written in the CSWADDR control register via the MCORE. With that option it is not possible to achieve a similar cycle count as the built-in routine (i.e., 47 cycles) as all loads and stores will require 2 cycles to complete instead of 1 cycle in the ROM routine (1 cycle to perform the load/store plus 1 cycle to fetch the next instruction: both accesses use the RAM, which means they cannot be done in parallel).

Memory Mapped Registers. The IPCM core has access to several registers through the system bus.

Host Channel 0 Pointer (MC0PTR). Contains the address, in the MCU memory space, of the initial IPCM context and scripts, that are loaded by the IPCM boot script which is running on channel 0. This is a read-only register.

DSP Channel 0 Pointer (DC0PTR). Contains the address, in the DSP memory space, of the initial IPCM context and scripts, that are loaded by the IPCM boot script which is running on channel 0. It is unused for now. This is a read-only register.

Current Channel Register (CCR). Contains the 5-bit priority of the channel whose context is installed. This is a read-only register.

Current Channel Priority (CCPR). Contains the 3-bit priority of the channel whose context is installed. This is a read-only register.

Highest Pending Channel Register (HPCR). Contains the decoded 32-bit number of the channel the task scheduler has selected to run next. A bit is set to "1" at position or channel selected (e.g., if HPCR contains value 0x04000000, channel 26 is the next channel selected by the scheduler). This is a read-only register.

Highest Pending Priority (HDPR). Contains the 3-bit priority of the channel the scheduler has selected to run next. This is a read-only register.

Current Channel Pointer (CCPTR). Contains the start address of the context data for the current channel: its value is CONTEXT_BASE+20*CCR (CONTEXT_BASE=0x0800); this is a read-only register.

CHN0ADDR. Contains the address of the channel 0 routine programmed by the MCORE; it is loaded into a General register at the very start of the boot and the IPCM jumps to the address it contains. By default, it points to the standard boot routine in ROM.

Address Space. The IPCM has two internal busses: the Instruction bus used to read instructions from the memory; and the data bus used to access the same memories as those visible on the instruction bus, plus some memory mapped registers (scheduler status and OnCE registers) and 5 peripheral registers (USB, UART1, UART3, MMC & Video SAP).

Instruction Memory Map. It is based-on a 14-bit address bus and a 16-bit data (instruction) bus; instructions are fetched from either program ROM or program RAM. An IPCM script is able to change the contents of the program RAM that is also visible from the data bus.

The first two instruction locations (at 0 and 1) are special. Location 0 is where the PC is set on reset. Location 1 is where the PC is set upon the execution of an illegal instruction. It is expected that both of these locations will contain a jmp to handler routines.

Data Memory Map. All of the data accessible to IPCM scripts make tip the data memory space or the IPCM. This address space has several components: ROM, RAM, peripheral registers, and scheduler registers (CCR, HPCR and CCPTR) and OnCE registers. IPCM scripts can read and write to the context RAM, data RAM and peripheral registers.

The address range is 16 bits and the data width os 32 bits; however, when accessing peripheral registers (USB, etc.), the data width may be different; in that case, during a write, the unused part of the 32-bit data to write is ignored by the peripheral; during a read, the missing part of the 32-bit read data is replaced by '0's.

IPCM Initialization

After hardware reset, the IPCM 116, the program RAM, context RAM, and data RAM have unpredictable contents. The active register set is assigned to channel 0 and the PC is initialized to all zeros. However, since the channel enable register is all zeros, there are no active channels and the IPCM is halted.

To start up the IPCM, the host processor 106 (i.e. host) first creates some channel control blocks in host memory for the control channel (channel 0) and then initializes the channel 0 pointer register to the address of the first control block. It then sets bit 0 (corresponding to channel 0) in the channel enable register.

Upon being enabled, the IPCM 116 then begins executing the script located at address 0 in the program ROM for channel 0.This ROM 308 script will read the channel 0 pointer register and, using the address contained therein, begin fetching (using DMA) the first channel control block. If the block contains a valid command, it interprets the command (which will normally be to download something from host to IPCM memory) and proceeds to implement the command and move on to the next control block. This continues until an invalid channel command is reached, at which time the script will halt, awaiting the host to re-enable the channel again.

There are also two means to make the IPCM boot on a user-defined script. First, by using the OnCE (either via its Jtag interface of its MCORE interface) to download any code in the IPCM RAM and force the IPCM to boot on that code; second, by using the CHN0ADDR register in the Host programming model; the IPCM boot code fetches the contents of that register and jumps to the given address.

The execution of an IPCM script depends on both the instructions that make up the script and the data context upon which it operates. Both must be initialized before the script is allowed to execute. Each of the 32 channels has a separate data context, but may share scripts and locations in data RAM.

The host manages the space in program RAM and data RAM. It also manages the assignment of IPCM channels to the device drivers that need them. Channels are initialized by the host by using channel 0 to download any required scripts and data values and the channels initial context. The context contains all the initial values of the registers, including the PC. Then the host 106 enables the channel and the channel becomes active and begins fetching and executing instructions from its script.

Refer to attached Appendix A entitled INSTRUCTION SET FOR RISC PROCESSOR CORE OF IPCM, which describes a complete set of preferred instructions for use in the IPCM 116 in accordance with one embodiment of the present invention.

The following further describes the DSP DMA unit and the host processor DMA unit corresponding to the embodiment employing the instruction set of Appendix A. functional units.

The functional unit instructions cause an 8-bit code, found in the low 8-bits of the instruction, to be asserted on the functional unit control bus. Some of these bits are used to select one of several functional units. In order to establish a programming convention, we will assume the selection bits are some number of the most significant bits of the 8-bit code. Furthermore, some number or the least significant bits will be decoded by a given functional unit to establish the type of operation to perform.

For the host DMA unit 312, the DMA instructions control the DMA state machine and may cause a DMA cycle on the associated memory bus. There are three registers associated with the host DMA unit, an address register (MA), a data buffer (MD) and a state machine register (MS).

The address register (MA) contains the pointer into DMA memory associated with the next data transfer. It has byte granularity. Reading the register with the ldf instruction (i.e. read) has no side effects. Writing the address register may have side effects. If there is value write data in the buffer, and the address is changed, the write data will be flushed (i.e., a DMA write cycle will be issued). If the prefetch bit is set and if there are no valid write data, a DMA read cycle will be issued with the new address.

As data is transferred to or from the data buffer, the address register is incremented by the number of bytes transferred/Of the address increments across a 32-bit word boundary any valid write data in the buffer will be flushed.

In the data buffer register (MD), a DMA cycle is not always associated with a stf instruction which loads the write buffer, the instruction may just load a subunit of transfer into the buffer register as it accumulates bytes which will be later used in full size memory transfers. The DMA unit keeps state as to which bytes are valid and does the correct shifting and insertion of new data. The instruction that loads the write buffer can conditionally cause the resulting buffer to be flushed, causing a DMA write cycle, even if the buffer is not entirely filled.

A ldf instruction that reads the data buffer, may cause a DMA cycle if the data has not already been fetched. Each read transfer can conditionally cause a prefetch, if all the bytes in the buffer have been transferred.

Writes and reads of the data buffer may cause destination or source faults, respectively. As the MLB does not support 24-bit accesses, the Host DMA triggers an error when a 3-byte access is requested on the MLB. That only no occurs when a flush or a fetch is requested; the internal MD register can have a 3-byte data at any moment as far as no external access is performed. The eDRAM supports 3-byte accesses.

There is the special case of the flush: using byte accesses to MD, it is possible to have 3 active bytes and request a flush; the 3 active bytes in MD will be correctly written to the eDRAM; but the access will cause an error if the write is done on the MLB.

The state register (MS) contains the DMA state-machine value. It is not meant to be accessed by the user in normal mode. In fact, as context switches may occur while the DMA is in any state, it is necessary to save that state, which is done by the context switch routine.

The Prefetch and Flush management allows the IPCM RISC machine to go on while a DMA access is performed. When the RISC Core requires a prefetch (p=1) or an auto-flush (f=0) to the Host DMA, it will receive an immediate transfer acknowledge before the DMA has finished the external access; which allows the RISC Core to do other things like accessing another DMA machine.

However, the user must be aware of the inherent limits of that mechanism: as far as the DMA has not a FIFO stack to store commands, if a prefetch/auto-flash command is issued, whereas the DMA has not finished its previous access, the transfer acknowledge will be delayed until the preceding access is over.

Another point is the management of errors: as the DMA immediately sends an acknowledge to the RISC Core, it assumes no error will occur (except if it detect the access is forbidden like a 24-bit access to the MLB). If an error occurs, it will be flagged (transfer error acknowledge) for the following DMA access.

That should not be a problem if the DMA is used properly. The prefetch/auto-flush feature is meant to be used in hardware loops and a last access with no prefetch (p=0) or a forced flush (f=1) should be performed after the hardware loop: that access will gather any remaining error (its own as well as an error from the previous prefetch or auto-flush access).

The DSP DMA Unit 310 is functionally identical to the host DMA unit 312 with minor restrictions. It allows 32-bit and 16-bit transfers to the Quartz DMA.

The DMA instructions control the DMA state machine and may cause a DMA cycle on the associated memory bus. There are three registers associated with the host DMA unit, an address register (DA), a data buffer (DD) and a state machine register (DS).

The address register (DA) contains the pointer into DMA memory associated 'with the next data transfer. It has byte granularity. Reading the register with the ldf instruction has no side effects. Writing the address register may have side effects. If there is valid write data in the buffer, and the address is changed, the write data will be flushed (i.e., a DMA write cycle will be issued). If the prefetch bit is set and if there are no valid write data, a DMA read cycle will be issued with the new address.

As data is transferred to or from the data buffer, the address register is incremented by the number of bytes transferred. If the address increments across a 32-bit word boundary any valid write data in the buffer will be flushed.

In the data buffer register (DD), a DMA cycle is not always associated with a DMA write instruction which loads the write buffer. The instruction may just load a subunit of transfer into the buffer register as it accumulates bytes which will be later used in full size memory transfers. The DMA status keeps state as to which bytes are valid and does the correct shifting and insertion of new data. The instruction that loads the write buffer can conditionally cause the resulting buffer to be flushed, causing a DMA write cycle, even if the buffer is not entirely filled.

A DMA read instruction that reads the data buffer, may cause a DMA cycle if the data has not already been fetched. Each read transfer can conditionally cause a prefetch, if all the bytes in the buffer have been transferred.

Writes and reads of the data buffer may cause destination or source faults, respectively. As the Quartz DMA does not support byte accesses, the DSP DMA detects any unauthorized access size and triggers an error accordingly. Unauthorized sizes are 1 byte and 3 bytes. That only occurs when a flush or a fetch is requested. The internal DD register can have a I-byte or a 3-byte data at any moment as far as no external access is performed.

The state register (DS) consists of 00110000 32-bit read with no side effect.

The Prefetch and Flush management allows the IPCM RISC processor to go on while a DMA access is performed. When the RISC Core requires a prefetch (p=1) or an automatic flush (f=0) to the Host DMA, it will receive an immediate transfer acknowledge before the DMA has finished the external access; which allows the RISC Core to do other things like accessing another DMA machine.

However, the user must be aware of the inherent limits of that mechanism: as far as the DMA has not a FIFO stack to store commands, if a prefetch/auto-flush command is issued whereas the DMA has not finished its previous access, the transfer acknowledge will be delayed until the preceding access is over.

Another point is the management of errors: as the DMA immediately sends an acknowledge to the RISC Core, it assumes no error will occur (except if it detects the access is forbidden like a 24-bit access to the MLB). If an error occur, it will be flagged (transfer error acknowledge) for the following DMA access.

That should not be a problem if the DMA is used properly: the prefetch/auto-flush feature is meant to be used in hardware loops and a last access with no prefetch (p=0) or forced-flush (f=1) should be performed after the hardware loop: that access will gather any remaining error (its own as well as an error from the previous prefetch or auto-flush access).

Programming Conventions

Much of the programming model as seen by the host or DSP is not mandated by the hardware architecture of the IPCM, but rather by the scripts that run on the IPCM. Some of these scripts will be in ROM so the conventions they impose are not easily changeable.

On the host processor side, There are 32 channel control blocks (CCBs) in a array whose base address is specified in the C0PTR. Each control block consists of four 32-bit words. The first word will contain status which is currently undefined. The second word contains a pointer to the base of an array of buffer descriptors (Bds). The third word contains a pointer to the current BD. The fourth word is currently unused.

The contents of a channel control block may only be changed by the host when the channel is not running.

The host buffer descriptors (refer to FIG. 6) form an array of programmable size, the last buffer descriptor is marked as such. The array of buffer descriptors is treated as a ring, with some logically contiguous portion owned by the host, and the remainder by the IPCM. A status bit indicates the ownership of each buffer descriptor.

When a buffer descriptor changes ownership from the host to the IPCM, the count field indicates how much data is to be transmitted or the size of the receive buffer. When ownership reverts back to the host, the count indicates how much data was transmitted or received.

Channel 0 Commands. The COMMAND field of a buffer descriptor contains an 8-bit command code used to communicate between the host and the IPCM. Currently the channel 0 script recognizes only the following commands: (1) Set the IPCM address to be used in subsequent commands to the value contained in the buffer address field; (2) Copy from the host memory at buffer address to the IPCM memory; (3) Copy to the host memory at buffer address from the IPCM memory; (4) Copy from the host memory to the channel context of the channel number in the high 5 bits; and (5) Copy to the host memory from the channel context of the channel number in the high 5 bits.

On the DSP side, there are 32 channel control blocks (CCBs) in a array whose base address is specified in the C0PTR. The CCB for channel 0 is not used. Each channel control block consists of eight 16-bit words/The first two words will contain status which is currently undefined. The second two words contain a pointer to the base of an array of buffer descriptors (Bds). The third two words contain a pointer to the current BD. The fourth two words are currently unused.

Dynamic Memory Refresh Methods

Referring briefly back to FIG. 2, the processor platform is illustrated including the refresh controller responsible for refreshing the dynamic random access memory, i.e. eDRAM. The refresh controller 220 is coupled to the eDRAM 108 via the r bus 240 through the data path select 218, which acts to multiplex access to the eDRAM from other competing devices, such as the IPCM 116, the host processor 106, and the LCD controller 204.

As is known in the art, dynamic memory (DRAM or eDRAM) is required to be provided DC power and refreshed periodically so that the data stored in the memory is retained. In contrast, static memory (e.g. SRAM) does not need to be refreshed as long as a constant power supply is coupled thereto. The refresh controller 220 of one embodiment of the processor platform 100 is designed to conserve as much power as possible, which for handheld applications is advantageous in extending battery life.

The refresh controller 220 has two basic modes of operation: an active mode and a data retention mode. The active mode is invoked during normal operation of the eDRAM 108. The active mode is used anytime the product incorporating the processor platform 100 is operated by the end-user. The active mode uses a "cycle stealing" distributed refresh method as known in the art of discrete DRAM implementations.

Data retention mode is invoked when the product incorporating the processor platform 100 is not operational and it is desired to retain the contents of the eDRAM 108. This data retention mode has three operating modes: (1) distributed refresh method, (2) a "selective refresh" method and (3) a "temperature compensated" refresh method.

The distributed refresh method as known in the art is identical to the active mode of operation in that the memory is refreshed periodically, whereas the selective refresh and the temperature compensated refresh may be used individually or together in order to reduce the amount of power required to retain data in the eDRAM memory array or may be used together to achieve a further overall reduction in the power consumed to retain data, which results in a longer battery life in which is particularly important to handheld applications.

Even though the active mode and distributed refresh technique are well known in the art, the refresh controller 220 advantageously uses a low frequency clock source from a time of day module operating at 32 kHz, although in other embodiments any clock known in the art may be used. Thus, in preferred embodiments, the clock input 252 to the refresh controller 220 is the time of day clock required for use in the product incorporating the processor platform 100. This 32 kHz clock input 252 is multiplied (×2) within the refresh controller 220 and used to activate the refresh cycle. As is known in the art, a counter is provided within the refresh controller 220 having 'n' number of states where 'n' is equal to the total number of rows in the array. The counter is incremented modulo 'n' with each clock transition. "Sense amplifiers", as known in the art, perform the actual refresh of the selected bit cells within the rows.

Advantageously, the refresh controller 220 uses the already provided time of day clock as the clock input; thus, eliminating the need for a separate dedicated clock to run the refresh controller 220 as is done conventionally. Employing a separate dedicated clock for the refresh controller 220 further adds to the power consumed by the system when the power is off.

Figure 7:
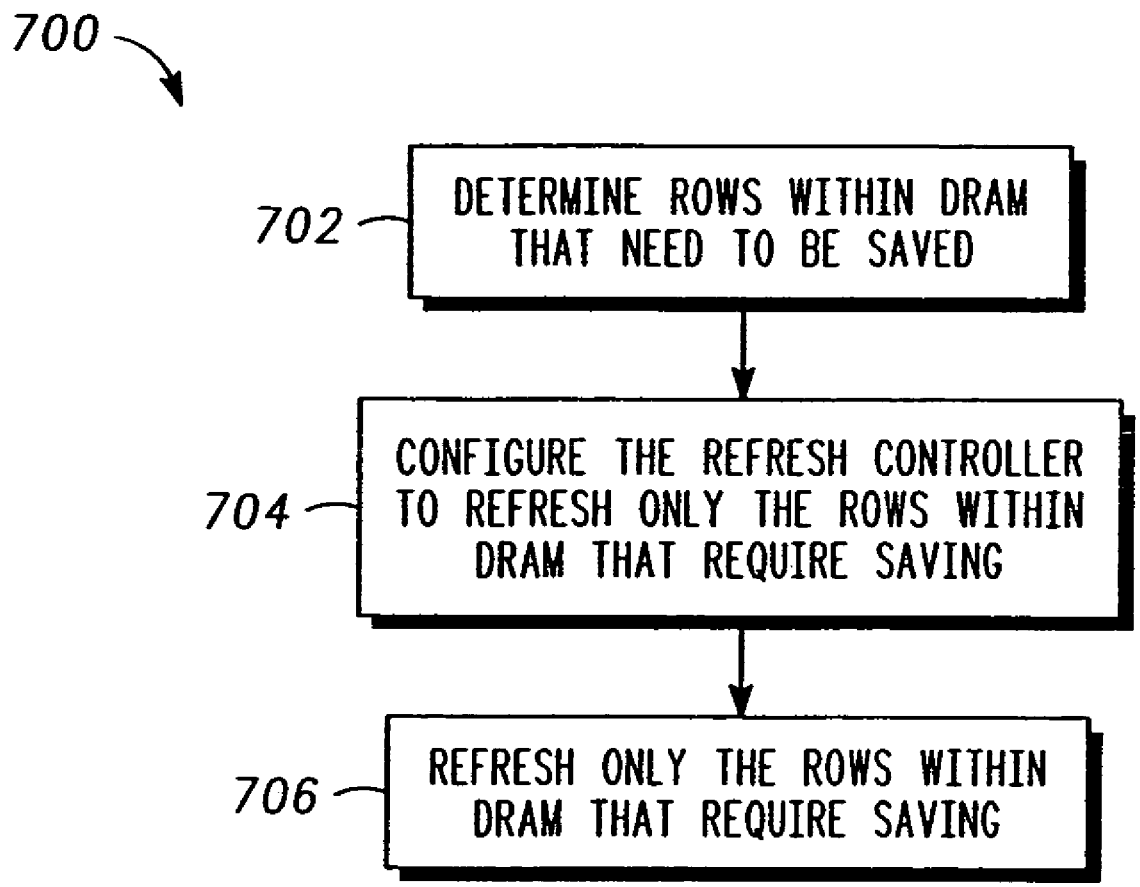
FIG. 7 is a flowchart of the steps performed in implementing a selective refresh technique performed by a refresh controller of FIG. 2 in accordance with one embodiment of the present invention.

Referring next to FIG. 7, The selective refresh method advantageously reduces the numbers of rows in the memory (e.g. eDRAM 108) to be refreshed in order to reduce power consumption at the expense of reducing the number of memory cells that will be retained. For example, if the memory (i.e. DRAM) is divisible into multiple portions, one or more of the multiple portions of the memory may be refreshed without refreshing all of the multiple portions. Specifically, the multiple portions may be rows of memory in an array. Thus, the contents of the rows of the memory being refreshed will be saved, while the contents of the data held in memory rows not being refreshed will be lost. For example, while the device is being shut down by the user (e.g. turned off), the host processor 106 makes a determination of which rows within the memory, e.g. eDRAM 108, need to be saved and which portions (e.g. rows) do not need to be saved (Step 702). Next, the host processor 106 sends a control signal to the refresh controller 220 instructing which rows or portions of the host processor memory is desired to be saved (Step 704). The refresh controller 220 is configured to refresh only the identified rows or portions within memory for the duration of time that the power is off. Then, the refresh controller 220 accesses the host processor memory (e.g. eDRAM 108 through the data path select 218) and refreshes the configured rows (Step 706). Thus, less power is consumed in the refresh of the memory since only part of the memory is being refreshed, instead of the entire memory being refreshed. In this embodiment, this provides quite a savings in power since the eDRAM 108 is large and typically less than the entire eDRAM 108 needs to be saved.

The selective refresh method implemented by the refresh controller 220 is described as follows. Given that there are n rows within the memory array, e.g. eDRAM 108, define j as the total number of rows in the memory array to be refreshed such that j is a number between 0 and n. The algorithm then becomes:

i=0
Refresh Row$_i$
i=i+1 modulo j.

In other words, the refresh controller 220 modulo 'n' counter is reduced to a modulo (n–a) counter where 'a' is the number of rows to be omitted from the refresh activity.

Figure 8:
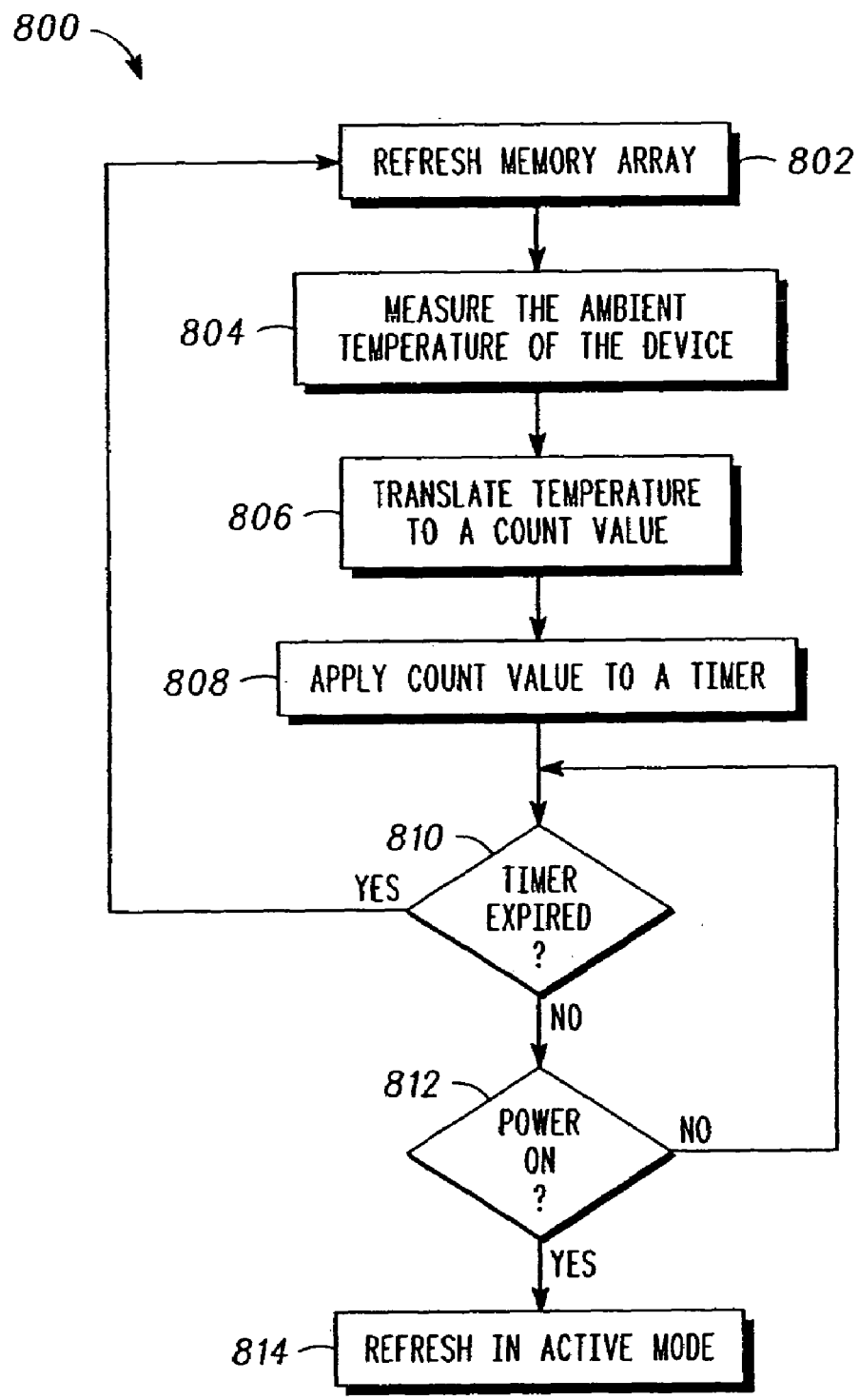
FIG. 8 is a flowchart of the steps performed by the refresh controller of FIG. 2 in performing the temperature compensated method of memory refresh in accordance with another embodiment of the present invention.

Referring next to FIG. 8, a flowchart 800 is shown of the steps of the refresh controller 220 of FIG. 2 in performing the temperature compensated method of memory refresh. The temperature compensated method of memory refresh adjusts the periodicity of the refresh activity based on ambient temperature of the product. At room temperature and below, this can save a considerable amount of power, which is important to increasing battery life in battery operated handheld devices.

Generally, the higher the temperature, the more often a given memory, e.g. eDRAM, is required to be refreshed. Prior art approaches design the refresh rate of a refreshing unit around "worst case" scenarios in which the product incorporating the DRAM would be at an unusually high default temperature. As such, for most of the time, the memory is actually "over-refreshed". However, in size and power conscious applications, such as for use in the processor platform 100 used as a multimedia wireless handheld device where power consumption is desired to be minimized, such "over-refreshing" may lead to a waste of power in operating the refresh controller more than necessary.

Thus, in contrast to conventional refresh controllers, the default temperature assumed for the refresh controller 220 is very low, such that the default refresh rate is less (i.e. the time in between refreshes is longer), often resulting in a savings of power. However, the temperature of the product may be at this low temperature or below, but at other times the ambient temperature of the product will be above this low refresh rate temperature. Unless the refresh rate is compensated for higher temperatures, the data retained in the DRAM will be lost in between refresh cycles. Thus, the temperature compensated method of refreshing measures the ambient temperature of the product in order to determine if the refresh rate needs to be increased or if it can remain at a slower refresh cycle in order to save power. When the ambient temperature of the product is high, the time between refresh cycles is decreased.

Specifically, the temperature compensated refresh method is described below. First, given a digital timer circuit that is clocked with an accuracy of +/–100 ppm and having a resolution of at least 0.1 second. The timer shall be capable of measuring time using a suitable clock signal and signaling an "event" after a pre-programmed time has elapsed. The timer shall have a register which is set to an integer value and is used to represent a pre-programmed value elapsed time to be measured. Also given an electronic digital thermometer circuit providing an indication range of x to y degrees with an accuracy of +/"j" degrees and further given a translation table consisting of a non-volatile memory array (e.g. a pre-programmed ROM) of "n" elements with each element containing an integer number herein referred to as "count". The bounds of the array (i.e. number of elements) are determined by the following equation: n=y–x, where n is the number of array elements and x and y upper and lower temperature range limits.

The absolute value and range of "count" must be compatible with the absolute value and range of the "count" register that is supported in the digital timer. Each "count" entry is assigned to occupy one element within the array. The entries of "count" are ordered in the array in a linear ascending manner such that the first element in the array corresponds to the lowest measured temperature (i.e. x) and the last element in the array corresponds to the highest measured temperature (i.e. y).

The value assigned to each count entry is made from empirical data taken from actual samples of the actual DRAM memory device intended to be used. As an alternative, the values for "count" may be determined through computer simulation methods of the leakage characteristics of the transistors used in the memory array as a function of changes in ambient temperature. In either case, the value of "count" is to represent the minimum refresh rate necessary to maintain data integrity at a specific temperature within the range of x to y degrees. Each element in the array is to represent an incremental change in ambient temperature staring at temperature x and incrementing to temperature y. The contents of each element is to represent the minimum necessary refresh rate to maintain data integrity. Additional tolerance must be given to accommodate digital temperature accuracy "j" as well as memory operating voltage tolerance and expected unit to unit variation. It is expected that while the elements of the array are ordered in linear fashion with respect to temperature, the values of "count" may represent an exponential characteristics.

The temperature compensated refresh method operating procedure begins by refreshing all rows in the memory array (Step 802). Note that rows to be refreshed may be governed by "selective refresh method" described above with reference to FIG. 7, such that Step 802 may be refreshing less than all of the rows (portions) of memory in the memory array. Next, an ambient temperature is measured (Step 804) using digital thermometer. Next, the ambient temperature measurement is translated to a count value using a look-up table (Step 806). The lookup table represents various refresh rates at different temperatures determined through simulation and empirical data. If the measured temperature is out of bounds for the lookup table then the first element, in the case exceeding the lower boundary "x", or the last element, in the case of exceeding the higher boundary "y", should be chosen. The count value is applied to the digital timer circuit (Step 808). Once the timer "event" has expired, i.e. the digital timer circuit expires (Step 810), refresh all rows; thus, repeating Steps 802 through 810. All steps are repeated indefinitely until the product is turned on (Step 812); thus, active refresh mode is reentered (Step 814).

Thus, by employing the temperature compensated refresh method of memory refresh, power is conserved, especially at or below room temperature operating environments, in comparison to a standard refresh operation, e.g. the distributed refresh method.

The "temperature compensated mode" together with the "selective refresh mode" can advantageously be operated simultaneously in order to consume the lowest possible data retention power. The operating modes of the refresh controller are configured by the host processor via signaling overt the h bus 232 prior to product shut down. The refresh controller 220 automatically reverts to the "Normal" refresh mode of operation (e.g. distributed refresh) when the host processor 106 re-enters the active state, i.e. the power is turned on. The transition between data retention and normal operation (active mode) is performed seamlessly without requiring any intervention from the host processor 106.

Figure 9:
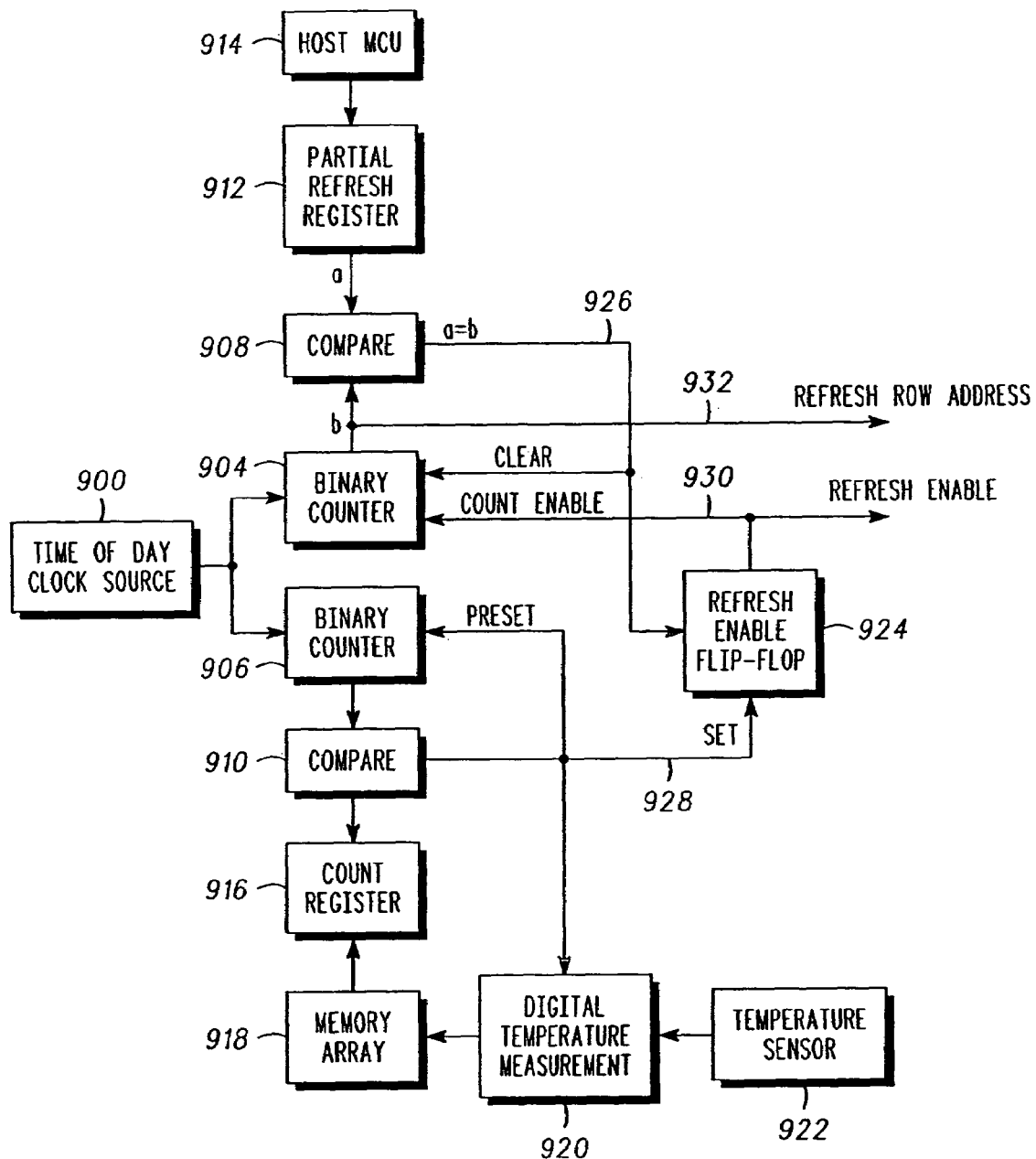
FIG. 9 is a block diagram of a memory refresh system using the selective refresh technique and the temperature compensated refresh techniques of FIGS. 7 and 8.

Referring next to FIG. 9, a block diagram is shown of a memory refresh system 900 using the selective refresh technique and the temperature compensated refresh techniques of FIGS. 7 and 8. Shown is a time of day clock 902, binary counters 904 and 906, comparators 908 and 910, partial refresh register 912, host processor 914 (host MCU 914), count register 916, memory array 918, digital temperature measurement 920, temperature sensor 922, refresh enable flip flop 924, clear signal 926, set signal 928, refresh enable signal 930 and refresh row enable 932.

Consistent with the descriptions associated with FIGS. 7 and 8, a digital temperature sensor 922 measures an ambient temperature. This temperature measurement 920 is sent to memory array 918 and translated into a count value according to a look up table stored in the memory array, as described above with reference to FIG. 8. The count value corresponds to a time measurement in between refresh cycles for various operating temperatures. The count value is copied into a count register 916. This count value is then compared to the value of binary counter 906 by comparator 910 coupled therebetween. Binary counter 906 is coupled to the time of day clock 902 such that it counts according to real time.

When the value in binary counter 906 equals the count value in the count register 916, the comparator 910 outputs a set signal 928 to set the refresh enable flip-flop 924 to activate a refresh cycle, i.e. the refresh enable flip-flop 924 outputs a refresh enable signal 930 (e.g. refresh enable signal 930 goes high or "1"). At this point, after an amount of time determined according to the temperature the memory is refreshed. The set signal 928 is also output back to binary counter 906 (resetting it back to zero or another reference starting point) and to the digital temperature measurement 920, which is re-loaded into the memory array 918 in order to determine the next variable amount of the time for the next refresh cycle. If the temperature remains the same, the time in between refresh cycles remains the same. As the temperature changes, the time in between refresh cycles will change. For example, if the temperature drops, then the time in between refresh cycles is lengthened, advantageously conserving power since, the refresh cycle is less often.

Additionally, the host processor is coupled to a partial refresh register 912 such that the host processor 914 loads a value into the partial refresh register 912 indicating what portion of the system memory to refresh, e.g. which rows to refresh and which rows not to refresh. The value is the partial refresh register 912 is then compared to the value of binary counter 904 by comparator 908 coupled therebetween. Binary counter 904 is also coupled to the time of day clock 902, but does begin to start counting until comparator 910 outputs the set signal 928 which is also coupled to binary counter 904. Thus, once the refresh cycle (refresh enable signal is output) is activated by the set signal 928 into the refresh enable flip-flop 924, then the binary counter 904 begins to count.

Once the value in binary counter 904 equals the value in the partial refresh register 912, the comparator outputs a clear signal 926 to the refresh enable flip-flip 924 and back to the binary counter 904. The clear signal resets binary counter 904 and causes the refresh enable flip-flop to disable the refresh enable signal 930 (e.g. the refresh enable signal 930 goes low or "0"). This effectively stops the refresh process such that less than the entire portion of the memory is refreshed (as determined by the host processor prior to power off) which advantageously conserves power. Note that in this embodiment, the binary counter also counts a number corresponding to the refresh row address in memory (DRAM), i.e. refresh row address signal 932.

The memory refresh system shown in FIG. 9 advantageously uses both the selective refresh technique and the temperature compensated refresh technique to synergistically reduce power consumption during the refreshing of DRAM. The components used are well known in the art. Most of the components may be a part of the refresh controller 220 of FIG. 2 depending on the embodiment. For example, in one embodiment, the temperature sensor 922, temperature measurement 920 and memory array 918 are located on a separate chip, while the host processor is located on the same processor platform. The partial refresh register 912, comparators 908 and 910, binary counters 904 and 906, count register 916, and the refresh enable flip-flop 924 are all part of the refresh controller 220.

While the invention herein disclosed has been described by means of specific embodiments and applications thereof, numerous modifications and variations could be made thereto by those skilled in the art without departing from the scope of the invention set forth in the claims.

What is claimed is:

1. A memory access system comprising:
a memory;
a multiplexer coupled to the memory via a first bus having a first bus width;
a host processor coupled to the multiplexer via a second bus having a second bus width, wherein the second bus width is less than the first bus width; and
a display controller for receiving display image data from the memory via the multiplexer for display on a display panel, where the display controller is coupled to the display panel and the display controller is coupled to the multiplexer via a third bus having a third bus width the same as the first bus width to allow the memory to be utilized as a buffer for both the host processor and the display controller such that one of the display controller and the host processor may access the memory without restricting the ability of the other of the host processor or display controller to access the memory.

2. The memory access system of claim 1 wherein the first bus width is 128 bits.

3. The memory access system of claim 1 wherein the second bus width is a predetermined number of bits, the predetermined bit number being either 8, 16, or 32 bits.

4. The memory access system of claim 1 further comprising a programmable direct memory access module coupled to the multiplexer via a fourth bus having a fourth bus width less than the first bus width to allow the memory to be used as a direct memory access node.

5. The memory access system of claim 4 wherein the fourth bus width is a predetermined number of bits, the predetermined bit number being either 8, 16, or 32 bits.

6. The memory access system of claim 1 wherein the memory is embedded onto a processor platform including the host processor and the display controller.

* * * * *